United States Patent
Long et al.

(10) Patent No.: US 10,771,524 B1
(45) Date of Patent: Sep. 8, 2020

(54) METHODS AND SYSTEMS FOR A DECENTRALIZED DATA STREAMING AND DELIVERY NETWORK

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

( * ) Notice: Subject to any disclaimer, the term of this patent is extended or adjusted under 35 U.S.C. 154(b) by 0 days.

(21) Appl. No.: 16/751,772

(22) Filed: Jan. 24, 2020

Related U.S. Application Data

(60) Provisional application No. 62/880,682, filed on Jul. 31, 2019, provisional application No. 62/914,176, filed on Oct. 11, 2019.

(51) Int. Cl.
| | | |
|---|---|---|
| *H04L 29/06* | (2006.01) | |
| *H04L 29/08* | (2006.01) | |
| *H04L 9/06* | (2006.01) | |

(52) U.S. Cl.
CPC ........ *H04L 65/4084* (2013.01); *H04L 9/0637* (2013.01); *H04L 29/08306* (2013.01); *H04L 63/101* (2013.01); *H04L 67/104* (2013.01); *H04L 67/108* (2013.01); *H04L 67/12* (2013.01); *H04L 2209/38* (2013.01); *H04L 2209/56* (2013.01)

(58) Field of Classification Search
CPC ............. H04L 67/104; H04L 29/08306; H04L 65/4084
See application file for complete search history.

(56) References Cited

U.S. PATENT DOCUMENTS

| | | | | |
|---|---|---|---|---|
| 7,243,103 B2 * | 7/2007 | Murphy | ............... | H04L 41/00 |
| 7,356,487 B2 * | 4/2008 | Kitze | ............... | G06Q 30/0283 |
| | | | | 370/389 |

(Continued)

OTHER PUBLICATIONS

Wenbo Wang et al, Decentralized Caching for Content Delivery Based on Block Chains: A Game Theoretic Perspective (Year: 2018).*

(Continued)

*Primary Examiner* — Lashonda T Jacobs
(74) *Attorney, Agent, or Firm* — American Patent Agency PC; Daniar Hussain; Xiaomeng Shi

(57) ABSTRACT

Methods and systems for delivering data contents among peer nodes in a decentralized data delivery network are disclosed. The network comprises peer-to-peer (P2P) connections implemented on top of a content delivery network (CDN) having CDN servers that provide fragments of data files to network nodes. Such a hybrid network comprises viewer nodes, edge cacher nodes, tracker servers, and optionally a payment server. A smart tracker provides caching instructions to guide cachers in storing, delivering, and relaying content to viewer nodes. The smart tracker also provides peer lists to viewer nodes, by selecting active cacher nodes to provide access to data fragments, based on network locations and/or geolocations of neighboring nodes, and a content data type of the desired data file. A software development kit (SDK) is provided for integration into existing third-party content viewers so that the functionality of the hybrid network is available to users via existing content viewers.

20 Claims, 15 Drawing Sheets

(56) References Cited

U.S. PATENT DOCUMENTS

| | | | | |
|---|---|---|---|---|
| 7,478,400 | B1* | 1/2009 | Banerjee | G06F 16/10 |
| | | | | 719/313 |
| 7,586,839 | B2* | 9/2009 | Childress | G06F 11/1464 |
| | | | | 370/216 |
| 7,633,887 | B2* | 12/2009 | Panwar | H04L 29/06027 |
| | | | | 370/254 |
| 7,664,861 | B2* | 2/2010 | Guntupalli | H04L 67/104 |
| | | | | 709/227 |
| 7,743,023 | B2* | 6/2010 | Teodosiu | G06F 16/184 |
| | | | | 707/612 |
| 7,818,402 | B1* | 10/2010 | Zhang | H04L 67/108 |
| | | | | 709/219 |
| 8,005,975 | B2* | 8/2011 | Liu | G06F 15/16 |
| | | | | 709/231 |
| 8,478,836 | B1* | 7/2013 | Chang | H04L 67/2852 |
| | | | | 709/213 |
| 10,404,781 | B2* | 9/2019 | Reddy | H04L 67/06 |
| 10,554,729 | B2* | 2/2020 | Yerkes | H04L 67/1046 |
| 10,592,578 | B1* | 3/2020 | Mokashi | H04N 21/4331 |
| 2003/0050966 | A1* | 3/2003 | Dutta | H04L 67/1038 |
| | | | | 709/203 |
| 2003/0204602 | A1* | 10/2003 | Hudson | H04L 67/06 |
| | | | | 709/228 |
| 2004/0064693 | A1* | 4/2004 | Pabla | H04L 67/104 |
| | | | | 713/168 |
| 2007/0280279 | A1* | 12/2007 | Mituhasi | H04L 67/12 |
| | | | | 370/428 |
| 2008/0289006 | A1* | 11/2008 | Hock | H04L 67/108 |
| | | | | 726/4 |
| 2009/0100128 | A1* | 4/2009 | Czechowski | H04L 67/1076 |
| | | | | 709/203 |
| 2009/0248697 | A1* | 10/2009 | Richardson | G06F 12/0813 |
| 2010/0138511 | A1* | 6/2010 | Guo | H04L 67/104 |
| | | | | 709/207 |
| 2011/0047215 | A1* | 2/2011 | Guo | H04L 65/4084 |
| | | | | 709/204 |
| 2012/0144451 | A1* | 6/2012 | Gutt | H04L 67/18 |
| | | | | 726/3 |
| 2013/0007218 | A1* | 1/2013 | Shah | H04L 45/302 |
| | | | | 709/219 |
| 2013/0073727 | A1* | 3/2013 | Souza | H04L 45/44 |
| | | | | 709/224 |
| 2013/0263194 | A1* | 10/2013 | Zhang | H04N 21/23106 |
| | | | | 725/92 |
| 2014/0074991 | A1* | 3/2014 | Gibson | H04L 67/1021 |
| | | | | 709/219 |
| 2014/0173022 | A1* | 6/2014 | Morrison, III | H04L 67/1063 |
| | | | | 709/217 |
| 2014/0195612 | A1* | 7/2014 | Guo | H04L 67/1085 |
| | | | | 709/204 |
| 2014/0280563 | A1* | 9/2014 | El-Beltagy | H04L 67/1076 |
| | | | | 709/204 |
| 2015/0120833 | A1* | 4/2015 | De Foy | H04L 67/104 |
| | | | | 709/204 |
| 2015/0134767 | A1* | 5/2015 | L'Heureux | H04L 65/60 |
| | | | | 709/213 |
| 2015/0189011 | A1* | 7/2015 | Hunt | H04L 67/108 |
| | | | | 709/219 |
| 2015/0326657 | A1* | 11/2015 | Cohen | H04L 67/108 |
| | | | | 709/231 |
| 2015/0358421 | A1* | 12/2015 | Gupta | H04L 67/288 |
| | | | | 709/202 |
| 2016/0099855 | A1* | 4/2016 | Mladenov | H04L 43/0888 |
| | | | | 709/224 |
| 2016/0381127 | A1* | 12/2016 | Gibson | H04L 43/10 |
| | | | | 709/219 |
| 2018/0255090 | A1* | 9/2018 | Kozloski | H04L 63/1416 |
| 2019/0089760 | A1* | 3/2019 | Zhang | H04L 65/1069 |
| 2019/0141045 | A1 | 5/2019 | Stocker | |
| 2019/0230385 | A1 | 7/2019 | Beck | |
| 2019/0289048 | A1* | 9/2019 | Brown | H04L 67/146 |
| 2019/0356674 | A1* | 11/2019 | Irazabal | H04L 63/105 |
| 2020/0050691 | A1* | 2/2020 | Surampalli | G06F 16/2379 |

OTHER PUBLICATIONS

S.M.Y. Seyyedi et al, Hybrid CDN-P2P Architectures for Live Video Streaming: Comparative Study of Connected and Unconnected Meshes (Year: 2011).*

Hao Yin et al, Design and Deployment of Hybrid CDN-P2P System for Live Video Streaming: Experiences with LiveSky (Year: 2009).*

Melika Meskovic et al, Content Delivery Architectures for Live Video Streaming: Hybrid CDN-P2P as the best option (Year: 2012).*

Mili Co, "Blockchain Platforms for Content Creators," Vlogging Hero, May 13, 2019, available at: https://vlogginghero.com/blockchain-content-creators-crypto-youtubers-streamers/, last accessed: Aug. 15, 2019.

Mathieu Planche, "Disrupting OTT video: video on the blockchain," Witbe.net Blog, Jul. 12, 2018, available at: www.witbe.net/2018/07/12/disrupting-ott-video-video-blockchain/, last accessed: Aug. 15, 2019.

Nicole Jao, "California-based startup lino fights social-platform power with blockchain," TechNode, Jan. 16, 2019, available at:https://technode.com/2019/01/16/meet-lino-the-chinese-company-bringing-decentralized-content-to-the-world/, last accessed: Dec. 4, 2019.

Lightning Labs, Inc., "The Lightning Network," Lightning network webpage, available at: https://lightning.engineering/technology.html, last accessed: Dec. 4, 2019.

Joseph Poon, et al., "The Bitcoin Lightning Network, Scalable Off-Chain Instant Payments," Lightening Network Documents, available at: http://lightning.network/docs/, last accessed: Dec. 4, 2019.

David Hamilton, "Laolu—Lightning Network Powered Video Platform," Bitcoin Lightning News, Sep. 11, 2018, available at: https://www.bitcoinlightning.com/laolu-lightning-network-powered-video-platform/, last accessed: Aug. 5, 2019.

Sudhir Khatwani, "Bitcoin's Lightning Network Payment Channel Explained!", The Money Mongers, Aug. 8, 2019, available at: https://themoneymongers.com/payment-channels/, last accesssed: Aug. 15, 2019.

Nichanan Kesonpat, "Bitcoin Scaling, Lightning Network & the Future with Micropayments," Nichanan Kesonpat Personal Blog, Jan. 25, 2019, available at: https://www.nichanank.com/blog/2019/1/5/bitcoin-scaling-lightning-network-micropayments, last accessed: Dec. 4, 2019.

Streamspace, LLC., "Blockchain Powered Content Delivery and Distribution," Stream Space, available at: https://www.stream.space/, last accessed: Dec. 4, 2019.

Streamspace, "Dear StreamSpace Community Member," Medium, Jul. 16, 2018, available at: https://medium.com/@stream_space/dear-streamspace-community-member-4f51624e54c, last accessed: Nov. 30, 2019.

Demian Brener, "A Decentralized Pay-As-You-Go Streaming Service," Medium, Feb. 27, 2015, available at: https://medium.com/@demibrener/a-decentralized-pay-as-you-go-streaming-service-b71ef89cd714, last accessed: Aug. 15, 2019.

Eric Tang, "Token Economies, Stream Token, and Livepeer," Medium, Nov. 2, 2017, available at: https://medium.com/@ericxtang/token-economies-stream-token-and-livepeer-de8469332021, last accessed: Nov. 30, 2019.

Nadja Bester, "Stream: Streaming Video on the Blockchain," Invest in Blockchain, Oct. 30, 2017, available at: https://www.investinblockchain.com/stream-streaming-video-blockchain/, last accessed: Nov. 30, 2019.

Syed Taha Ali, et al., "The Nuts and Bolts of Micropayments: A Survey," arXiv, Oct. 9, 2017, available at: https://arxiv.org/abs/1710.02964, last accessed: Nov. 30, 2019.

Jieyi Long, "Building the Theta Protocol: Part I, High-Level Architecture Overview," Theta Labs, Medium, Feb. 15, 2018, available at: https://medium.com/theta-network/building-the-theta-protocol-part-i-73519139dee4, last accessed: Nov. 27, 2019.

(56) References Cited

OTHER PUBLICATIONS

Jieyi Long, "Building the Theta Protocol: Part II, Overview of the Hybrid Mesh Streaming Technology," Theta Labs, Medium, Mar. 30, 2018, available at: https://medium.com/theta-network/building-the-theta-protocol-part-ii-ea9d 12e221bb, last accessed: Nov. 27, 2019.
Jieyi Long, "Building the Theta Protocol: Part III, Breaking Down the Application of a Unidirectional Payment Channel," Theta Labs, Medium, Apr. 19, 2018, available at: https://medium.com/theta-network/building-the-theta-protocol-part-iii-7a0ba6d5a352, last accessed: Nov. 27, 2019.
Jieyi Long, "Building the Theta Protocol: Part IV, Approaching Ultra High Transaction Throughput via Off-Chain Micropayment Pool," Theta Labs, Medium, May 2, 2018, available at: https://medium.com/theta-network/building-the-theta-protocol-part-iv-d7cce583aad1, last accessed: Nov. 27, 2019.
Theta Labs, "Theta Network: Decentralized video streaming, powered by users and an innovative new blockchain," White Paper, Nov. 11, 2018, available at: https://s3.us-east-2.amazonaws.com/assets.thetatoken.org/Theta-white-paper-latest.pdf?v=1575518630.27, last accessed: Nov. 27, 2019.
Jieyi Long, et al., "Scalable BFT Consensus Mechanism Through Aggregated Signature Gossip," 2019 IEEE International Conference on Blockchain and Cryptocurrency (ICBG), pp. 360-367. IEEE, 2019.
BNP Media, "Bluzelle Launches Decentralized Data Delivery Network", Powering Edge Data Centers, May 20, 2009.
CryptoArgha, "VideoCoin: Decentralized Next Generation Video Streaming Platform," https://www.videocoin.io/, 2019.
Daniel Khun, "Decentralized Video Platform Built on Ethereum Raises $8 Million," Jun. 19, 2019.
Devadutta Ghat, "A Decentralized Video Encoding, Storage, and Content Distribution Network," VideoCoin Development Association, Ltd., Version 1.0.30, Nov. 7, 2017.
Doug Petkanics et al., "Peer to peer video services. Incentivized," Livepeer.org, 2018.
Doug Petkanics et al., "Protocol and Economic Incentives for a Decentralized Live Video Streaming Network," Dec. 12, 2018.
Doug Petkanics, "Livepeer Project Overview," Apr. 11, 2018.
East-West Digital News, "Driven by industry boom, eSports startup Play2live raises $30 million in ICO," Mar. 21, 2018.
Epixel Solutions, "FLIXXO—Decentralized ICO &Token for New Video Sharing," Epixel Solutions Pvt. Ltd., Nov. 4, 2007.
Garelik et al., "Flixxo: Community based video distribution," Nov. 12, 2018.
Gershgorn et al., "Play2Live's unique P2P CDN solution to the challenge of Internet speed for gamers," Dec. 28, 2017.
Hasley Minor et al., "Video Infrastructure for the Blockchain-Enabled Internet," VideoCoin Development Association Ltd., 2019.
Irzykiewicz et al., "Bluzelle Launches Decentralized Data Delivery Network," https://verasity.io/, Apr. 20, 2018.
Kambar Ali Khan, "FLIXXO: A decentralized video sharing platform," Sep. 27, 2017.
Lino Blockchain Overview, 4 pages, 2019.
Liu et al., "Distributed Resource Allocation in Blockchain-based Video Streaming Systems with Mobile Edge Computing," IEEE Transaction on Wireless Communications, Dec. 2018, DOI: 10.1109/TWC.20181885266.
PeerStream, "PeerStream Technology Powers Multimedia Social Connectivity," PeerStream, Inc., 2019.
Streemie, "Blockchain enhanced video streaming platform," 2019.
Wilson Wei, "Value Sharing Content Economy," Lino Network, 2018.
Zokama, "Introducing Decentralized Video Platforms," Apr. 13, 2018.

* cited by examiner

900

┌─────────────────────────────────────┐
│  902  APPLICATIONS                  │
│  DAPP PARTNERS & DEVELOPERS         │
└─────────────────────────────────────┘

┌─────────────────────────────────────┐
│  904                                │
│  CRYPTO ECONOMIC INFRASTRUCTURE     │
│  THETA LABS & PARTNERS              │
└─────────────────────────────────────┘

┌─────────────────────────────────────┐
│  906  THETA PROTOCOL                │
│  THETA LABS                         │
│  ┌──────────────┐  ┌──────────────┐ │
│  │  908         │  │  910         │ │
│  │  DELIVERY    │  │  LEDGER      │ │
│  │  PROTOCOL    │  │  PROTOCOL    │ │
│  └──────────────┘  └──────────────┘ │
└─────────────────────────────────────┘

FIG. 9

METHODS AND SYSTEMS FOR A DECENTRALIZED DATA STREAMING AND DELIVERY NETWORK

REFERENCE TO RELATED APPLICATIONS

This application is a non-provisional of and claims the benefit of priority to provisional application U.S. Ser. No. 62/880,682, filed on 31 Jul. 2019, entitled "Methods and Systems for Micropayment Support to Blockchain-Incentivized, Decentralized Video Streaming and Delivery," and is a non-provisional of and claims the benefit of priority to provisional application U.S. Ser. No. 62/914,176, filed on 11 Oct. 2019, entitled "Methods and Systems for Decentralized Data Streaming and Delivery Network," the entire disclosures of which are incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of decentralized data delivery, and pertain particularly to methods and systems for decentralized data streaming and delivery through a distributed hybrid network.

BACKGROUND OF THE INVENTION

The statements in this section may serve as a background to help understand the invention and its application and uses, but may not constitute prior art.

Internet video accounts for over three-quarters of all internet traffic today, and will increase further to 82% by 2022, according to Cisco's February 2019 Visual Networking Index (Cisco VNI™ Global IP Traffic Forecast for 2017-2022. The same report predicts that from 2017 to 2022, global Internet video traffic will grow four-fold, live Internet video will grow 15-fold, Virtual Reality and Augmented Reality traffic will grow 12-fold, and Internet gaming traffic will grow 9-fold. In the U.S., millennials between the ages of 18 and 34 are driving the growth of video streaming through the use of services like YOUTUBE, NETFLIX, HULU, and HBO. Streaming video among this group has jumped 256% from an average of 1.6 hours per week to 5.7 hours per week according to a SSRS Media and Technology survey, and mobile devices are leading the charge in video consumption.

Content Delivery Networks (CDNs), which are systems of distributed servers that minimize delay in delivering data to users by reducing the geographical distance between servers and users, are predicted by Cisco to carry 72% of Internet traffic by 2022, and they play an important role in distributing web content and streaming video data, by providing a backbone infrastructure to deliver data streams to end users. A major limitation of today's CDN networks is the so-called "last-mile" delivery problem, where a "last-mile" link between a limited number of Point-of-Presence (POPs) data centers and end users presents a bottleneck in the data streaming and delivery pipeline and often leads to less optimal user experience, including link failures, noticeable delays, choppy streams, poor picture quality, and frequent rebuffering. Another major concern is the CDN bandwidth cost, which can easily reach tens of millions of dollars per year for popular sites. These issues become more prominent with the coming era of high resolution digital media, for example 4K, 8K, and 360° VR streaming, and upcoming technologies such as light field streaming. For example, bandwidth requirements of today's mainstream 720p/HD streams jump by orders of magnitude for the newer systems.

To overcome such bandwidth limitations, decentralized peer-to-peer data streaming and delivery platforms have been developed based on self-organizing and self-configuring mesh networks. End users share redundant or unused computing, bandwidth, and storage resources, although distributed storage can make locating a requested file difficult. In addition, motivating and incentivizing users to actively share available resources require a secure and minimally delayed award system or payment method that is compatible with the decentralized natured of the peer-to-peer network, where it is also important to economically handle frequent, minuscule payments for small, individual data chunks transmitted to or received from peer nodes.

Therefore, in view of the aforementioned difficulties, there is an unsolved need to provide a low-latency, high-throughput, and micropayment-incentivized decentralized data streaming and delivery system.

It is against this background that various embodiments of the present invention were developed.

BRIEF SUMMARY OF THE INVENTION

Methods and systems are provided for decentralized data streaming and delivery through a distributed hybrid mesh network.

More specifically, in one aspect, one embodiment of the present invention is a method for distributing a data file within a decentralized data delivery network, comprising the steps to receive a request from a viewer peer node for accessing one or more fragments of the data file, where the decentralized data delivery network implements a hybrid architecture comprising one or more peer-to-peer (P2P) connections layered over a content delivery network (CDN) having at least one CDN server providing a plurality of fragments of the data file to one or more peer nodes of the network; extract, from the received request, a content type of the requested data file, and at least one of a network location of the viewer peer node and a geolocation of the viewer peer node; generate a peer list by selecting, from peer nodes currently active in the network, one or more cacher peer nodes to provide access to the one or more fragments of the data file, wherein each selected cacher peer node is selected based on the at least one of the network location of the viewer peer node and the geolocation of the viewer peer node, at least one of a network location of the selected cacher peer node and a geolocation of the selected cacher peer node, and the content type of the requested data file; and transmit the generated peer list to the viewer peer node.

In some embodiments, the computer-implemented method further comprises steps to receive client statistics from the one or more peer nodes, where the client statistic for each peer node comprises one or more of the network location of the peer node, the geolocation of the peer node, and a hardware specification of the peer node; send caching instructions to the one or more peer nodes to download a subset of the plurality of fragments of the data file from the CDN server, where the caching instructions are generated based on the client statistics. In some embodiments, the computer-implemented method further comprises steps to generate a popularity score for the data file, where the content type of the data file is a multi-media live stream, and where the caching instructions are generated further based on the popularity score.

In some embodiments, the computer-implemented method further comprises steps to determine an optimal distribution of the plurality of fragments of the data file to the one or more peer nodes of the network, where the content type of the requested data file is selected from the group consisting of video-on-demand (VOD) and a binary large object (BLOB), and where the optimal distribution defines which of the plurality of fragments of the data file each peer node should download from the CDN server.

In some embodiments, at least one cacher peer node in the peer list caches at least one of the plurality of fragments of the data file.

In some embodiments, the computer-implemented method further comprises steps to send payment authorization certificates to the cacher peer nodes on the peer list, to authorize the sharing of the data file to the viewer peer node; receive a service receipt from at least one cacher peer node on the peer list, where the service receipt was signed by the viewer peer node after receiving at least one fragment of the data file from the at least one cacher node; and send an updated off-chain transaction that accumulates a total payment amount including that for the at least one fragment of the data file to the cacher peer node.

In some embodiments, the network location of the viewer peer node is represented by an IP address, and the geolocation of the viewer peer node is represented by a latitude and a longitude.

In another aspect, one embodiment of the present invention is a computer-implemented method for accessing a data file within a decentralized data delivery network, comprising the steps to send a peer list request to a tracker server for accessing one or more fragments of the data file, where the peer list request comprises a content type of the requested data file, and at least one of a network location and a geolocation, and wherein the decentralized data delivery network implements a hybrid architecture comprising one or more peer-to-peer (P2P) connections layered over a content delivery network (CDN) having at least one CDN server providing a plurality of fragments of the data file to one or more peer nodes of the network; and receive, from the tracker server, a peer list of cacher peer nodes, where the peer list was generated by selecting, from peer nodes currently active in the network, one or more cacher peer nodes to provide access to the one or more fragments of the data file, where each selected cacher peer node is selected based on the at least one of the network location and the geolocation, at least one of a network location of the selected cacher peer node and a geolocation of the selected cacher peer node, and the content type of the requested data file.

In some embodiments, the computer-implemented method further comprises steps to send a probe message to each cacher peer node in the peer list for accessing a target fragment of the data file; send a request for the target fragment of the data file to a source cacher peer node that responds affirmatively to the probe message first; and receive the target fragment of the data file from the source cacher peer node.

In some embodiments, the computer-implemented method further comprises steps to send a probe message to each cacher peer node in the peer list for accessing a plurality of target slices of a target fragment of the data file, where the target fragment of the data file is divided into the plurality of slices; send a request for a target slice to each cacher peer node that responds affirmatively to the probe messages; and receive, concurrently, the target slices from the cacher peer nodes that responded affirmatively to the probe messages.

In some embodiments, the computer-implemented method further comprises steps to receive at least one of the one or more fragments of the data file from at least one cacher peer nodes in the peer list; and send a ping message to the tracker server periodically to indicate an active status as a cacher peer node. In some embodiments, the computer-implemented method further comprises steps to broadcast a local fragment list to a swarm of neighboring peer viewer nodes; receive a request for a fragment on the local fragment list from a peer viewer node in the swarm; and transmit the requested fragment to the peer viewer node.

In some embodiments, the computer-implemented method further comprises steps to sign a service receipt in response to receiving the target fragment of the data file from the source cacher peer node; and transmit the service receipt to the source cacher peer node.

In some embodiments, the network location is represented by an IP address, and the geolocation is represented by a latitude and a longitude.

In a third aspect, one embodiment of the present invention is a system for accessing a data file within a decentralized data delivery network, comprising at least one processor, and a non-transitory physical medium for storing program code accessible by the processor, the program code when executed by the processor causes the processor to send a peer list request to a tracker server for accessing one or more fragments of the data file, where the peer list request comprises a content type of the requested data file, and at least one of a network location and a geolocation, and where the decentralized data delivery network implements a hybrid architecture comprising one or more peer-to-peer (P2P) connections layered over a content delivery network (CDN) having at least one CDN server providing a plurality of fragments of the data file to one or more peer nodes of the network; and receive, from the tracker server, a peer list of cacher peer nodes, where the peer list was generated by selecting, from peer nodes currently active in the network, one or more cacher peer nodes to provide access to the one or more fragments of the data file, where each selected cacher peer node is selected based on the at least one of the network location and the geolocation, at least one of a network location of the selected cacher peer node and a geolocation of the selected cacher peer node, and the content type of the requested data file.

In some embodiments, the program code when executed by the processor further causes the processor to send a probe message to each cacher peer node in the peer list for accessing a target fragment of the data file; send a request for the target fragment of the data file to a source cacher peer node that responds affirmatively to the probe message first; and receive the target fragment of the data file from the source cacher peer node.

In some embodiments, the program code when executed by the processor further causes the processor to send a probe message to each cacher peer node in the peer list for accessing a plurality of target slices of a target fragment of the data file, where the target fragment of the data file is divided into the plurality of slices; send a request for a target slice to a cacher peer node that responds affirmatively to the probe messages; and receive, concurrently, the target slices from the cacher peer nodes that responded affirmatively to the probe messages.

In some embodiments, the program code when executed by the processor further causes the processor to receive at least one of the one or more fragments of the data file from at least one cacher peer node in the peer list; and send a ping message to the tracker server periodically to indicate an active status as a cacher peer node.

In some embodiments, the program code when executed by the processor further causes the processor to broadcast a local fragment list to a swarm of neighboring peer viewer nodes; receive a request for a fragment on the local fragment list from a peer viewer node in the swarm; and transmit the requested fragment to the peer viewer node.

In some embodiments, the network location is represented by an IP address, and the geolocation is represented by a latitude and a longitude.

According to yet another aspect, yet another embodiment of the present invention is a non-transitory storage medium for storing program code for accessing a data file within a decentralized data delivery network, the program code executable by a processor, and the program code when executed by the processor causes the processor to execute the steps as described herein.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 9 is a software architecture model diagram illustrating different components of a decentralized data streaming and delivery framework, according to one embodiment of the present invention;

DETAILED DESCRIPTION OF THE INVENTION

Figure 1:
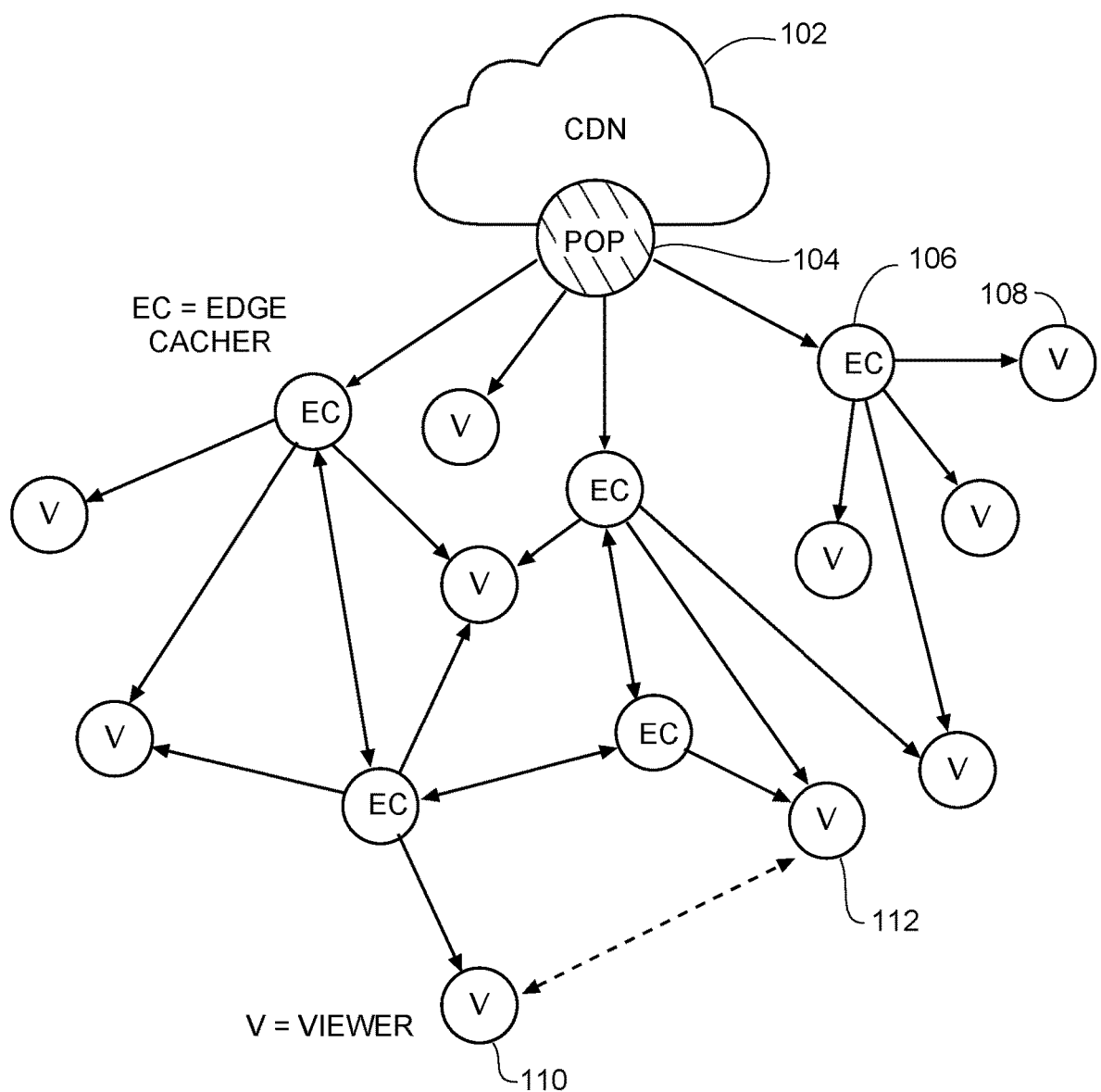
FIG. 1 is a network diagram illustrating a hybrid network architecture combining peer-to-peer networking with a traditional CDN, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark names may be interchangeably used in the specification and drawing to refer to the products/services offered by embodiments of the present invention. The term THETA may be used in this specification to describe the overall decentralized data streaming and delivery network or platform, the public ledger system for payment of bandwidth use or content streaming, as well as the company providing said network, platform, system, or service. With reference to the figures, embodiments of the present invention are now described in detail.

Overview

Broadly, embodiments of the present invention relate to methods and systems for low-latency, high-throughput data distribution in a decentralized hybrid data delivery network (hereafter the "THETA network" or "THETA data delivery network"), where peer-to-peer (P2P) data exchanges are facilitated on top of a content delivery infrastructure through the use of tracker servers, cachers, viewer client-side intelligence, and blockchain-based micropayment incentives for resource sharing. In particular, peer nodes are incentivized to share redundant or unused computing, bandwidth, and storage resources, to function as "cachers," "cacher nodes," or "caching nodes," where close-by peers support each other's file requests to reduce overall packet round-trip time, improve stream delivery quality, and reduce CDN bandwidth costs.

Various embodiments of the present invention are applicable, but not limited to, decentralized peer-to-peer data content delivery systems and platforms, which often focus on timely delivery of data content under strict, near real-time parameters. Peer nodes may function as end users as well as caching relays that source data content to nearby peers, plus connecting to a central content server when no close-by peer sources are available. To incentivize end users to join as caching nodes for sharing redundant bandwidth and storage resources, and to encourage more active engagement with content platforms and content creators, a decentralized public ledger system (hereafter the "THETA blockchain ledger system" or the "THETA blockchain") may be utilized to reward or compensate for caching and relaying data content to peer users at very fine granularities while offloading content distribution costs.

In one aspect, embodiments of the present invention enable a multi-layer "global cache" comprising peer viewers, edge cachers, and CDN servers, where each caching node may further utilize two local cache layers: memory and hard drive storage. In general computing, "caching" is the process of storing data in a cache, which is a temporary storage area for storing program codes and/or data that are used repeatedly and are likely to be requested again soon. When a cache miss occurs, that is, when data requested by an application is not found in the cache memory, the desired data are fetched from other cache levels or other storage units. Analogously, when many viewers tune in for the same P2P livestream within the THETA network, data chunks or fragments consumed by one node are likely to be requested by other near-by peers, with high concurrent user count leading to more peering resource availability and data delivery efficiency. Thus, each peer node may be viewed as a cache component within the THETA global cache, and may be referred to as a "cacher node" or a "caching node" within the network. In a unified cache lookup strategy, viewer nodes are accessed first, followed by edge cacher nodes, and CDN servers last. Within each caching node, memory (e.g., RAM) is accessed before the hard drive.

In implementing a global cache, embodiments of the present invention integrate each layer with the next to allow seamless switching between the layers, resulting in delivery of data to end users in a timely and efficient manner. Embodiments of the present invention adapt the concept of edge servers that are typically managed by CDN providers, and apply it to typical end users so that viewers themselves can fulfill the functionality of edge servers. This is done in two ways, by allowing viewers to act as relays while consuming video and/or other types of data, and by running dedicated software that leverages the existing hardware which third-party server farms already own, and are incentivized to contribute to data sharing in the network. For example, the THETA network as disclosed herein may provide a library, or a software development kit (SDK), that can be integrated directly into a platform's content viewer, e.g., a video player or an application that runs on a particular operating system.

More specifically, in the current disclosure, "viewer" nodes refer to general end user clients that consume delivered data, including various data content and file types such as live multi-media streams, video-on-demand, binary large objects, encrypted data, text data, audio, software updates, ads, large static data files, and the like. Hereinafter, "viewers" and video streaming are discussed in exemplary embodiments, for illustrative purpose only, without limiting the scope of the methods, systems, and devices as disclosed herein, which are capable of delivering and/or consuming various data content types with various reliability and latency requirements. Correspondingly, each network node is configured to support the different requirements of the various content types, such as the requirements of a live stream, Video on Demand (VoD), and other data types. Moreover, in a unified view of the data delivered within the network, different types of data content may all be considered as data files. Each caching node may store chunks, fragments, or slices of a data file, and may support "range requests" to avoid the need to download a large chunk of the file when only a very small fraction is needed. For example, a CDN server may serve data contents as data blobs, while also supporting byte-range requests.

An "edge cacher" as disclosed herein is a dedicated type of node that supports the relaying and propagation of the data files. An edge cacher may run on desktops, mobile devices, and server machines. It partitions a portion of local storage for caching high-demand data files such as live video streams, while content types such as software patches or other updates are often stored on local hard drive. That is, an edge cacher may interact with a machine's data storage to implement two local cache layers, a local memory and a local hard drive.

To enable data sharing among peers, the THETA network utilizes "smart trackers" to guide cacher nodes (viewers, edge cachers) self-organize into a semi-randomly connected network based on network distance and/or geo-locations, and to provide intelligence to cacher nodes to store and distribute data content among peers of the network. A tracker server may handle a very large number or an unbounded number of data streams or blobs effectively. Its function may be implemented with a micro-service architecture consisting of one or more of a signaling service, a grouping service, a stats service, an authenticity service, and a private API service.

In short, the THETA hybrid network combines the advantages of P2P and CDN techniques to achieve high scalability and high resource availability, and attains the following characteristics:
- Self-organizing, self-adaptive, self-evolving, minimal operational overhead, highly available, and robust.
- Plug and play: a network node can join or leave at any time.
- Supports delivery of various types of content (e.g., livestream, VoD, data blob, etc.) within a unified data retrieval framework.

Highly secure, Digital Rights Management (DRM) compatible, General Data Protection Regulation (GDPR) compatible.

In what follows, a THETA data delivery network infrastructure is disclosed for peer-to-peer content distribution, and software architecture of individual nodes within the THETA network are presented. Designs for the THETA blockchain ledger system are also disclosed.

Distributed Hybrid Network for Data Streaming and Delivery

In a traditional content distributing network (CDN), individual nodes are connected to a CDN server directly via a Point-of-Presence (POP) data center. On the other hand, nodes within a peer-to-peer (P2P) network share data directly with each other, without the need of a central server. That is, each peer node within a P2P network may be both a server/cacher or client.

Peer-to-peer (P2P) streaming often focuses on timely delivery of audio and video content under strict, near real-time parameters. P2P livestream delivery works best when many people tune in for the same stream at the same time. High concurrent user count means more peering resources are available, and thus peer nodes can pull data streams from each other more efficiently. Overall system capacity increases as more peer nodes become available. Moreover, robustness of the system is increased in a P2P network when compared to traditional CDNs, as nodes do not need to rely on a centralized server to retrieve content. This is especially important in cases of server failure. In contrast, for centralized CDN-based delivery, a high number of concurrent users places scalability pressures on the CDN servers instead.

One shortcoming of pure P2P streaming is availability. Peers come and go at any time, which makes it difficult to predict the availability of any given peer node. There are also inherent differences and asymmetries in nodes, such as upload and download capacities. On the other hand, a CDN server is more reliable and robust, and hence it can serve as a reliable "backup" when requested data is not available from peer nodes.

Taking advantage of both P2P networks and a CDN network, FIG. 1 shows a network diagram 100 of a decentralized data delivery "hybrid network" combining the two, according to one embodiment of the present invention. Within this hybrid data delivery network 100, peer-to-peer connections among viewers ("V") such as 108 and edge cachers ("EC") such as 106 operate on top of an existing CDN, which itself comprises one or more point of presence ("POP") servers such as 104. As discussed previously, a viewer is a network node, end user, or client that consumes delivered data, while an edge cacher is a dedicated, intermediate relay node that caches and/or relays data to neighboring peer nodes. Although individual nodes are labeled as either a viewer or an edge cacher in FIG. 1, a node may function both as a viewer and an edge cacher simultaneously. For example, the dashed line between viewers 110 and 112 on the edge of the network represents a data link over which each of nodes 110 and 112 may transmit cached data to the other.

Hybrid mesh streaming utilizes both P2P nodes (V and EC) and one or more CDN servers for data delivery, and thus combines the advantages of both, namely, high scalability of the P2P infrastructure along with the high availability of the CDN delivery backbone. One goal of this hybrid system is to achieve maximum CDN bandwidth reduction without sacrificing quality-of-service (QoS) critical to established streaming platforms such as NETFLIX, YOUTUBE, TWITCH, FACEBOOK and others. In a traditional CDN, every node pulls data streams directly from the POP server. In hybrid network 100, whenever possible, peer nodes may pull data from each other instead of from the POP server. That is, only a subset of nodes pull data streams from the POP server; other nodes simply pull data streams from their peer caching nodes which provide better and more efficient connections. Caching nodes thus augment the traditional CDN backbones with more caching layers for end viewers geographically far away from POPs of the CDN backbones. This hybrid architecture applies to both video on demand and live streaming scenarios, as well as other data streaming and delivery setups.

Figure 2:
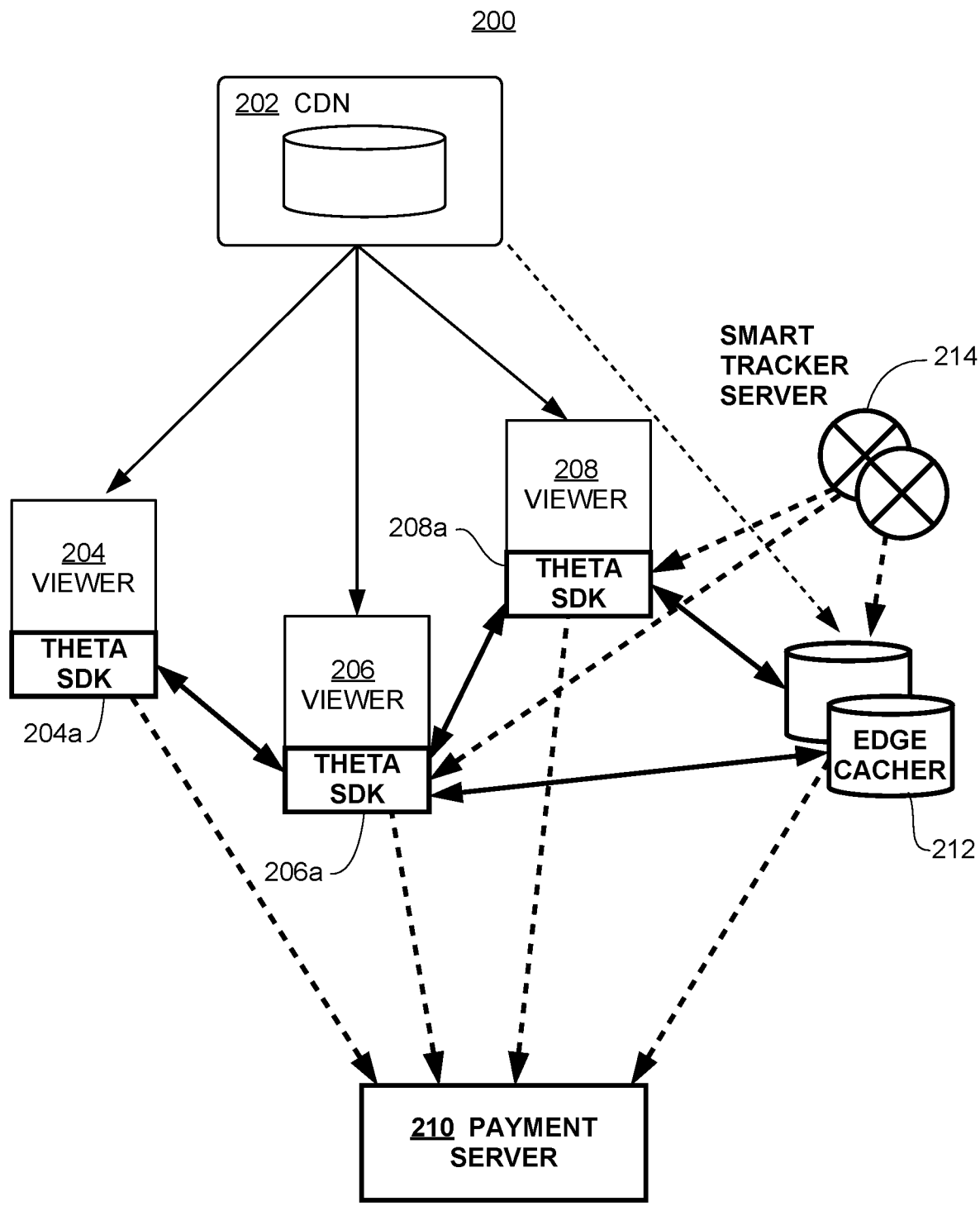
FIG. 2 is an illustrative network diagram showing a decentralized data streaming and delivery hybrid network with smart trackers and a payment server, according to one embodiment of the present invention.

More specifically, FIG. 2 is an illustrative network diagram showing a decentralized, hybrid network 200, according to one embodiment of the present invention. In this illustrative example, hybrid network 200 comprises a CDN server or backbone 202, viewer nodes 204, 206 and 208, edge cacher 212, smart trackers 214, and a payment server 210. Viewers 204, 206, and 208, and edge cacher 212 are each connected directed to CDN 202, possibly through a POP server (not shown); viewers 204 and 206 are directly connected; viewers 206 and 208 are also directed connected, and both linked to edge cacher 212. In this hybrid structure, a viewer node may attempt to pull data from peers first, and only resort to downloading from CDN 202 as a failure-proof backup. In addition to dedicated edge cacher 212, each viewer may serve as a cacher node as well.

Hybrid network 200 is designed to operate independently, or on top of an existing CDN which provides content to a plurality of peer nodes such as 204, 206, and 208. Although only one CDN server 202 is shown for simplicity, hybrid network 200 can operate with multiple CDN servers. Hybrid network 200 may also operate independently of CDN server 202 when sufficient number of peer nodes are operating within the network with sufficient amount of data.

In various embodiments, hybrid network 200 supports the transmission of various types of data content and files such as, but not limited to, live stream multimedia data, video-on-demand (VoD), large static data files, e.g., data blobs, system updates, game patches, advertisements, etc. In some embodiments, different types of data content may all be viewed as data files, with each file divided into small segments, chunks, fragments, or slices. In this disclosure, a file "fragment" refers to a section, portion, or fraction of a data file, and may have different granularities or resolutions in different embodiments. A data file fragment may be further divided into smaller slices, possibly on a byte-wise scale. Hybrid network 200 may store file fragments or slices instead of entire files in all or a subset of its constituent peer nodes. Live streams may be viewed as files being generated and streamed at the same time. In one example, the viewers and edge cachers can support Web RTC (Real-Time Communications) HTTP/HTTPS protocols.

Accordingly, peer nodes 204, 206, and 208 may include different types of viewer and/or edge cacher clients capable of processing different data content types. Although FIG. 2 shows edge cacher 212 as separated from viewer nodes 204, 206, and 208, one or more of peer nodes 204, 206, and 208 may simultaneously implement an edge cacher as well as an end user software using a THETA Software Development Kit (SDK) such as 204a, 206a and 208a, so that a viewer may store and distribute content via P2P connections while also consuming the content. Unlike some streaming services that require proprietary content viewers such as video players to be installed, the THETA SDK may be integrated into a third-party application or device so that data content accessed by a peer node may be viewed or played within the third-party application. A Software Development Kit (SDK) is a set of software development tools or programming packages for creating applications for a specific platform. An SDK may be compiled as part of the developed application to provide dedicated interfaces and functionalities. Alternatively, an SDK may be an individually compiled module, incorporable into an existing application or player as a plug-in, add-on, or extension in order to add specific features to the application without accessing its source code.

In various embodiments, peer nodes 204, 206, and 208 may each implement different types of client software that enable different functionalities. A peer node 212 which implements an edge cacher may store fragments of the content, or slices within the fragments, to be delivered. The slices may be transmitted to requesting peers as needed. A peer node functioning as an edge cacher 212 may be viewed as having two local cache layers, a memory and a hard drive. Such a peer node 212 may implement a unified cache lookup strategy, where the memory is first accessed and a hard drive may then be accessed for retrieving the requested content. However, it may be noted that some clients may not have hard drive storage (such as a mobile phone), in which case edge cacher 212 may be implemented as a single local cache. Therefore, an abstracted cache interface may be enabled so that devices with or without hard drives can act as edge cacher nodes within hybrid network 200. Such nodes may be used to share live streams and concurrent VoD which are stored in memory. In the case of patch updates, a hard drive is typically required as the patch updates are stored on the hard drive.

The various content types supported by hybrid network 200 may have different delay or latency requirements. For example, livestreams require real-time or near real-time delivery, while VoD may require real-time delivery for the portion that a user is currently watching. Data blobs may not require real-time support, but download time needs to be minimized nonetheless. In order to support the relaying or propagation of large files, a "range request," where a content fragment may be further divided into smaller slices and only a slice is requested and sent, may be supported in hybrid network 200. For example, CDN server 202 may support a range request while also able to provide a data blob as a complete large file.

Hybrid network 200 additionally includes one or more smart trackers 214 for managing the storage and consumption of data content within hybrid network 200. Smart trackers 214 provide guidance to edge cacher 212 in storing and delivering data, and may handle an unbounded number of live streams, VoD data, or data blobs concurrently. Smart trackers 214 may be implemented with a microservice architecture which comprises a signaling service 362 and a discovery service 364, as described in detail in relation to FIG. 3.

Guided by smart trackers 214, cacher nodes (edge cachers and viewers) may self-organize into semi-randomly connected networks based on network distance or their geolocations. In one example, physical distances may be estimated and nodes within a certain threshold distance may be selected for P2P data sharing. In some embodiments, cacher nodes are not partitioned into clusters to simplify backend design and to improve robustness of the network. The network therefore continues to function if any cacher node leaves the network, so that even if only one viewer node remains, this viewer node can still pull data directly from CDN 202. As more cacher nodes are added to the network, the network becomes more efficient and achieves higher CDN offload.

Furthermore, peer nodes shown in FIG. 2 may be communicatively coupled to a payment server 210 which facilitates and manages payment transactions among viewers 204, 206, and 208 and edge cacher 212 when data contents are distributed as files or file segments. One or more instances of payment server 210 may be implemented in hybrid network 200, as a dedicated network node, or physically co-located with another network node, such as CDN server 202, smart trackers 214, or any peer node within hybrid network 200. For example, payment server 210 may be co-located with smart tracker 214, where each is implemented as a software module. While smart tracker 214 determines P2P connections among peer nodes based on factors such as geographical distances and resource availabilities, it may also determine payment authorization groups, where only members of a group may exchange payments for participating in P2P content distributions. In various embodiments, payment server 210 may be implemented as a stand-alone payment service software module, or as part of the THETA SDK. In the exemplary embodiment shown in FIG. 2, peer nodes 204, 206, 208 and 212 are each individually connected to payment server 210. Additionally, in some embodiments, payment server 210 may be provided by a third-party, different from source CDN 202 as owned by a content distribution platform and viewers or edge cachers; in yet some embodiments, a content distribution platform may run payment server 210 itself.

In some embodiments, when two edge cachers exchange data, tit-for-tat compensation may be used and no crypto payment is involved. On the other hand, viewer clients may pay edge cachers micropayments through a resource-orientated micropayment pool, disclosed in co-pending application U.S. Ser. No. 16/726,148, filed on 23 Dec. 2019, entitled "Methods and Systems for Micropayment Support to Blockchain Incentivized, Decentralized Data Streaming and Delivery," incorporated by reference herein.

While FIGS. 1 and 2 provide architectural details of a THETA data delivery network, in what follows, a more global, abstracted view of the network is presented.

A Unified Global Cache

As each peer node within hybrid network 200 may function as both a data content server and consumer, the THETA data delivery network may be perceived as a multi-layer "Global Cache" for data content distribution, with benefits in both latency and throughput. Three global cache layers exist in the THETA data delivery network: a viewer layer (e.g., viewers 204, 206, and 208), an edge cacher layer (e.g., edge cacher 212), and a CDN layer (e.g., CDN server 202). When searching for a requested data file, a unified cache lookup strategy would access the viewer layer first, the edge cacher layer second, and the CDN last. Each component or node within this global cache may be implemented as different types of cache clients or modules, such as edge cacher clients, WebApp viewers, SDKs, firmware updaters, and the like.

For example, an edge cacher (e.g., 212) may be implemented as a dedicated software module that run on desktops, mobile devices, or server machines. When running on hardware devices, an edge cacher may partition a portion of the local storage for caching high-demand data files that need to be relayed, such as live video streams. On the other hand, game patches or file updates are often already in use by the hardware device itself, and can easily be made available for relaying to other nodes. The partitioning of local storage may be reconfigured dynamically through messages from the tracker server. The tracker server may identify the high demand files based on the number of viewer requests, geographical information of the requesters etc. Periodically, the tracker servers may instruct edge cachers to load and store different parts of the high demand files.

In addition, each cacher node may store fragments of a data file rather than the complete data file, or slices within the fragments, to be transmitted to requesting peers as needed. Each cacher module or cacher node may be viewed as having two local cache layers, a memory and a hard drive, and may implement a unified cache lookup strategy, where the memory is accessed first and the hard drive is accessed second for retrieving the requested content. In caching clients that do not have hard drive storage, such as in a mobile phone, an edge cacher may be implemented as a single local cache. Therefore, an abstracted cache interface is enabled so that devices with or without hard drives can act as edge cachers within the hybrid network. Such nodes may be used to share live streams and concurrent VoD stored in memory.

A Unified View on Data

Various content types supported by the hybrid network may all be viewed as data files divided into small segments, chunks, fragments, or slices. As discussed with referenced to FIG. 2, a file fragment refers to a section, portion, part, or fraction of a data file, and may have different granularities or resolutions in different embodiments. While a small file may be stored as a whole in an edge cacher, big files may be divided into fragments, where each fragment may be stored on different cacher nodes. That is, the hybrid network may distribute file fragments to a selected subset of nodes, where a tracker server determines the optimal distribution of the data files and file fragments within the network, based on network and cacher statistics such as resource availability, network connectivity, file popularity, and the like. A viewer may download different parts of a file from different edge cachers simultaneously, and viewers may pull data fragments from peers as much as possible before resorting to CDN servers. Furthermore, a file fragment may be further divided into even smaller slices, and caching nodes may support "range requests," where only requested slices are served.

As an example, a live stream may be viewed as a file being generated and streamed at the same time. In another example, a HTTP Live Streaming (HLS) live stream/VoD content typically has an accompanying playlist. If a playlist is not available for a large data blob, by default the data blob may be divided into smaller fragments of fixed size (e.g., 100 KB or 200 KB each).

In some embodiments, data fragments are 3 to 5 MB each in size. With slicing, the size of each data segment may be reduced further to less than 100 KB, thus greatly decrease network latency. Typically, if a fragment of data is transmitted over multiple hops, each hop needs to receive the whole fragment. If the fragment size is too large, the aggregated network latency will be very large as well. On the other hand, the side of each slice cannot be too small either, or setup cost could increase.

Different content types often have slightly different latency requirements. For example, livestreams require real-time delivery, while Video-on-Demand (VoD) may require real-time delivery of the portion currently being watched. Data blobs may not require real-time delivery, but download time should be minimized regardless.

An Exemplary Embodiment of a Hybrid Network

Figure 3:
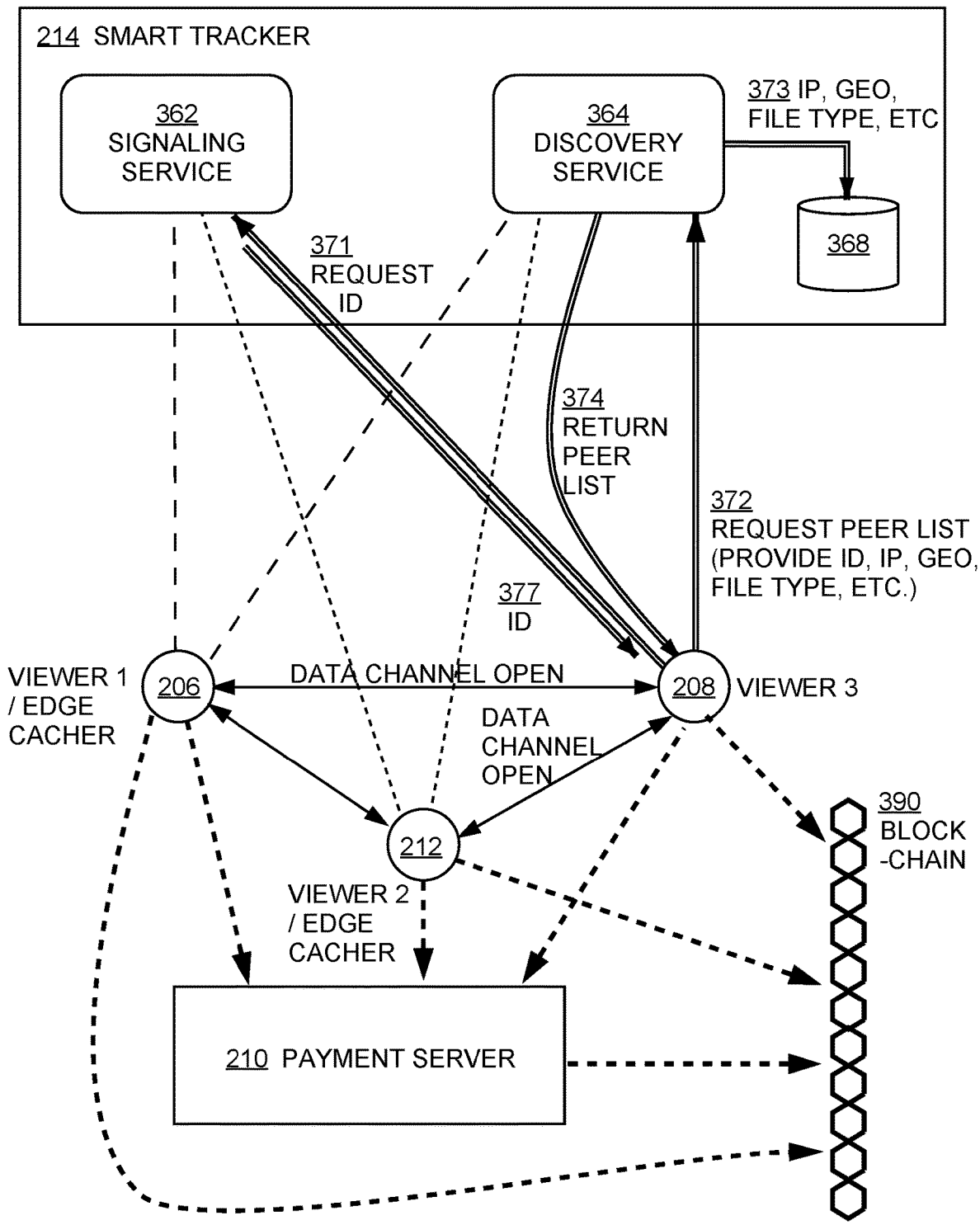
FIG. 3 shows exemplary interactions among individual nodes within a hybrid network, according to one embodiment of the present invention.

FIG. 3 shows exemplary interactions among individual nodes within a hybrid network, in accordance with some embodiments of the present invention. In this network diagram 300, illustrative functionalities of network entities are shown. Peer nodes 206, 208, and 212 are each connected to a signaling service 362 and a discovery service 364 provided by a smart tracker 214. Signaling service 362 facilitates handshakes between viewer 208 and viewer/edge cachers 206 and 312, for example, via the JavaScript Session Establishment Protocol (JSEP) based on the Web RTC standard. Discovery service 364 determines peers that are to be connected to each other based on various peer attributes such as, but not limited to, geolocations, file or data content types, Internet Protocol (IP) addresses, and so on.

In order to access content on the hybrid network, viewer 208 may initially transmit an ID request 371, such as via an HTTP request, to signaling service 362 for assignment of its own ID to be used within the hybrid network in order to access content. Signaling service 362 tracks active peer nodes, and may respond with ID 377 assigned to viewer 208. Viewer 208 then transmits ID 377 along with other attributes, such as its network location (e.g., as represented by its IP address), its geolocation (e.g., latitude and longitude), and file type requested, and a request 372 for a peer list of neighboring peer nodes that can serve the requested content. Discovery service 364 may then access a list of peers from a database 368 of smart tracker 214 based on the provided IP address, the geolocation, the file type requested, etc. 373. Discovery service 364 may then select and return a peer list 374 comprising one or more peer nodes, such as viewer 206 and viewer 212, both serving as edge cacher nodes as well, to which the viewer 208 may connect in order to access the requested content. In some embodiments, cacher nodes in peer list 374 are ranked according to the unified global caching scheme. That is, viewer nodes may be listed before edge cacher nodes, and viewer 208 may default to a CDN server when peer list 372 has been exhausted yet a desired data file fragment has not been found.

In this embodiment, signaling service 362 and discovery service 364 are co-located within the same smart tracker 214. ID 377 for viewer 208 may be communicated by signaling service 362 to discovery service 364 directly, and discovery service 364 may respond to viewer 208 with selected peer node list 374 and ID 377. In some embodiments, discovery service 364 may transmit attributes of the selected peer nodes in peer list 374, e.g., attributes of viewer 206 and viewer 212, such as their network location or network IP addresses, so that viewer 208 can transmit the content/slice requests to peer cacher nodes 206 and 212, and at their corresponding IP addresses. Viewer 208 thus employs ID 377 to obtain information necessary to open data channels directly with viewer 206 and/or viewer 212 to receive the content. Data channels between the peer nodes may persist until the data sharing/relaying operation is completed. In addition, any payment transactions between viewer 208, and the edge cachers 206 and 212 may be handled by payment server 210, including micropayments for individual content fragments or slices.

In this exemplary embodiment, each peer node 206, 208, and 212, as well as payment server 210 have access to a public blockchain ledger 390, namely the THETA blockchain. The THETA blockchain provides THETA tokens as a form of cryptocurrency incentive to edge cachers in the hybrid network. More details on the THETA blockchain are disclosed in later sections.

An Exemplary Embodiment of a Tracker Server

Figure 4A:
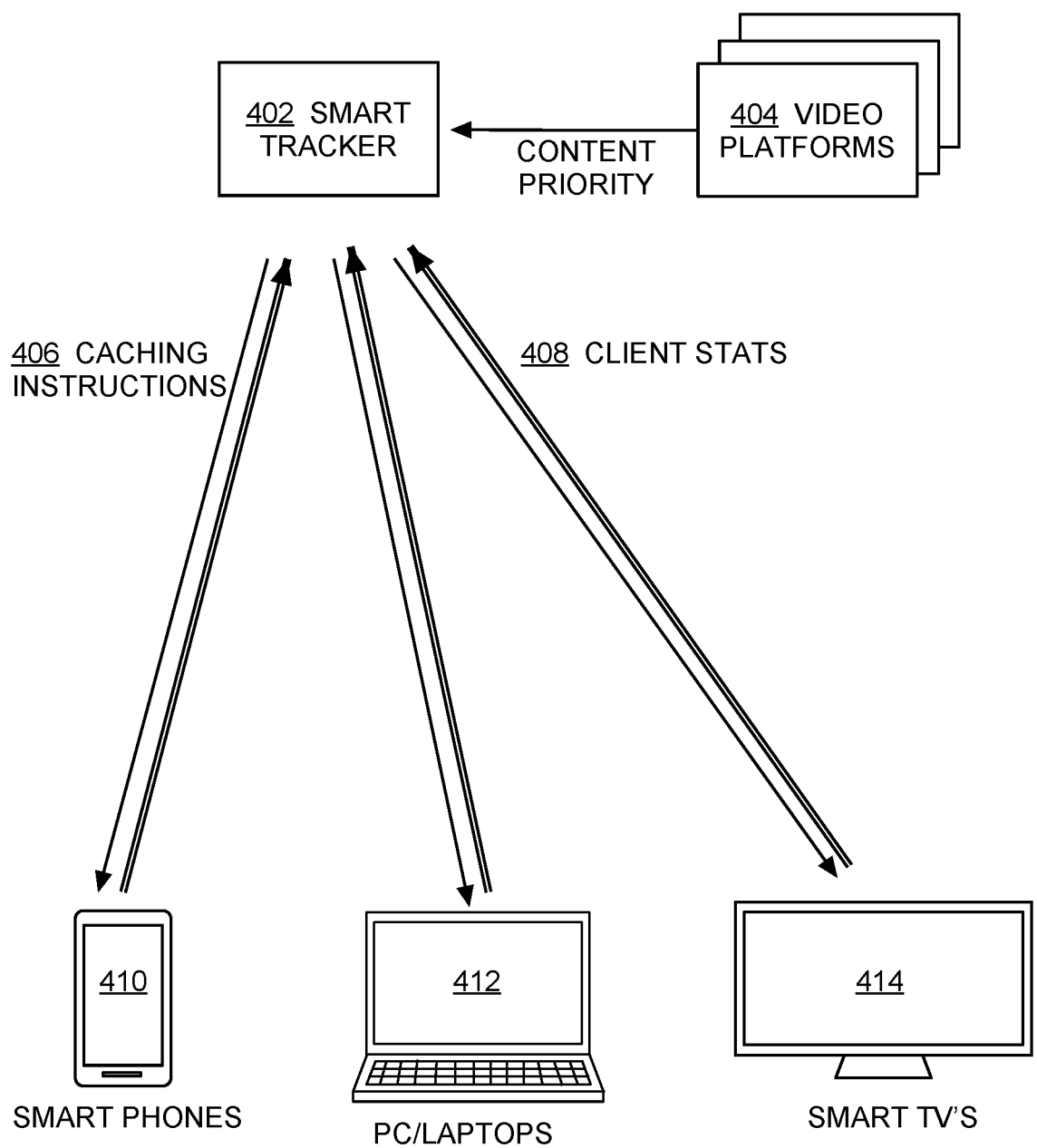
FIG. 4A shows a diagram of a smart tracker providing discovery service for distributing data fragments among cacher nodes based on geolocations and other factors, according to one embodiment of the present invention.

FIG. 4A shows a diagram of a smart tracker or tracker server 402 providing discovery service for distributing data fragments among cacher nodes based on geolocations and other factors, in accordance with an embodiment of the invention. Based on client stats 408 received from cacher nodes 410, 412, and 414, including but not limited to geolocations, content popularity (e.g., as measured by clicks), hardware specifications (e.g., bandwidth, memory storage, etc.), and content priority received from video platforms 404, smart tracker 402 provides caching instructions 406 to the cacher nodes. Caching instructions comprise what data blob/fragments/slices to cache, and how long should a cacher node keep the blob/fragments/slices. When a large data is fragmented and slices, tracker server 402 determines how different file parts are optimally distributed and cached on peer nodes of the network.

In one exemplary embodiment, smart tracker 402 gathers the following information from the edge cachers it interacts within a recent time window:

1) The geolocations of each edge cacher;
2) Key stats of the user requests sent to each edge cacher, including a) what content each user requested, b) the network location (e.g. IP address) and/or geolocation of each user;
3) The available resource on each edge cacher (e.g., CPU, network, disk space available).

Based on these data, the tracker can perform statistical and artificial-intelligence (AI) based analysis to predict what data content will be most popular in each geographical region, and how long they will be popular for. Further taken into account the available edge cacher resources in each region, smart tracker 402 may determine which edge cacher should store what portion of the popular content, and how long a data fragment should be stored on the edge cacher.

Tracker Server Architecture

In addition to a signaling service such as 362 and a grouping/discovery service such as 364, in some embodiments, a tracker server such as 214 and 402 may further comprise a stats service, an authenticity service, and a private Application Programming Interface (API) service. The authenticity service may provide a hash of each data fragment in case the CDN server does not provide etags. The private API service may provide access to private APIs for functions such as publishing content, configuration changes, force publishing content, and the like.

In FIG. 3, in order to provide a list of candidate peer nodes, discovery service 364 of tracker server 214 may record the location information of each peer joining the network, including its IP address, geographical location such as latitude/longitude, and a number of other performance parameters. With this information, discovery service 364 may organize peer nodes in a spatial database 368 optimized for storing and querying data that represent objects defined in geometric space. As a peer node joins the network, discovery service 364 may perform a spatial query to retrieve a list of candidate peers that are in close proximity and can provide data delivery quickly and efficiently.

As mentioned earlier, a peer node might leave the network at any time. Hence, tracker server 214 also needs to be aware of which nodes are active. To achieve this, an active peer node may maintain a socket connection with tracker server 214 and send heartbeat signals consistently. If tracker server 214 does not receive a heartbeat for a certain amount of time, it may consider that peer node as having left the network, and updates the spatial database accordingly.

In some embodiments, the "distance" between two peer nodes is measured by the number of router hops between them rather than the geographical distance. Typically, network distance and geographical distance are highly correlated, but they are not necessarily equivalent. For example, two computers could sit next to each other physically, but connect to different ISPs so there might be many hops between them. Hence, aside from geographical information, tracker server 214 may utilize the connectivity between IP addresses collected in the past to analyze and select neighbor candidates. For example, candidates returned by a spatial query may go through another filter to exclude those that are not connected to the same ISP as the requesting viewer's.

Figure 4B:
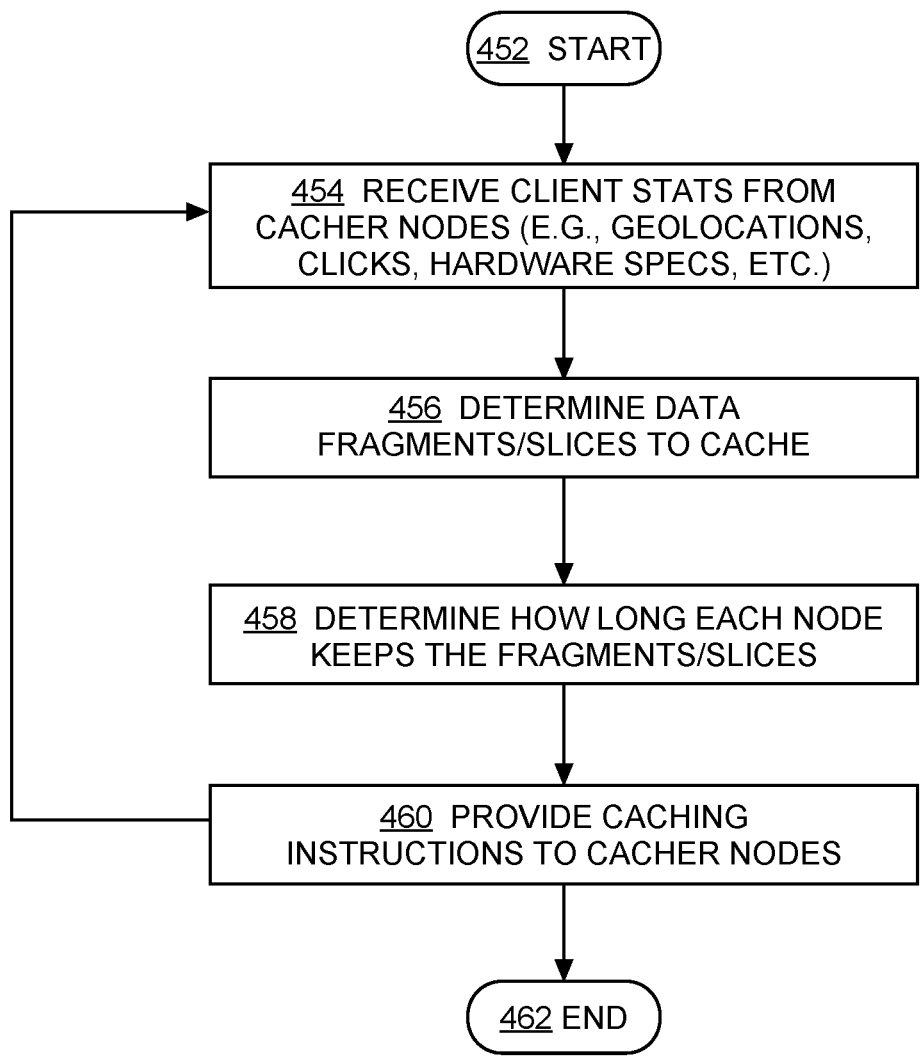
FIG. 4B is a flowchart for an exemplary process to provide caching instructions to cacher nodes by a smart tracker, according to one embodiment of the present invention.

FIG. 4B is a flowchart 450 for an exemplary process to provide caching instructions to cacher nodes by a smart tracker, according to one embodiment of the present invention. Upon initialization at step 452, the smart tracker may receive client stats in step 454 from cacher nodes, where such client stats may include geolocations, content popularity as measured by clicks or number of requests, hardware specifications such as bandwidth and storage capacity, and the like. At steps 456 and 458, caching instructions are generated on which data fragments and/or slices each connected cacher node should cache, and how long each node should keep the fragments and/or slices, based on the collected client stats. Such caching instructions are provided to connected cacher nodes at step 460. The process iterates until all requests have been met, and terminates at step 462.

Figure 4C:
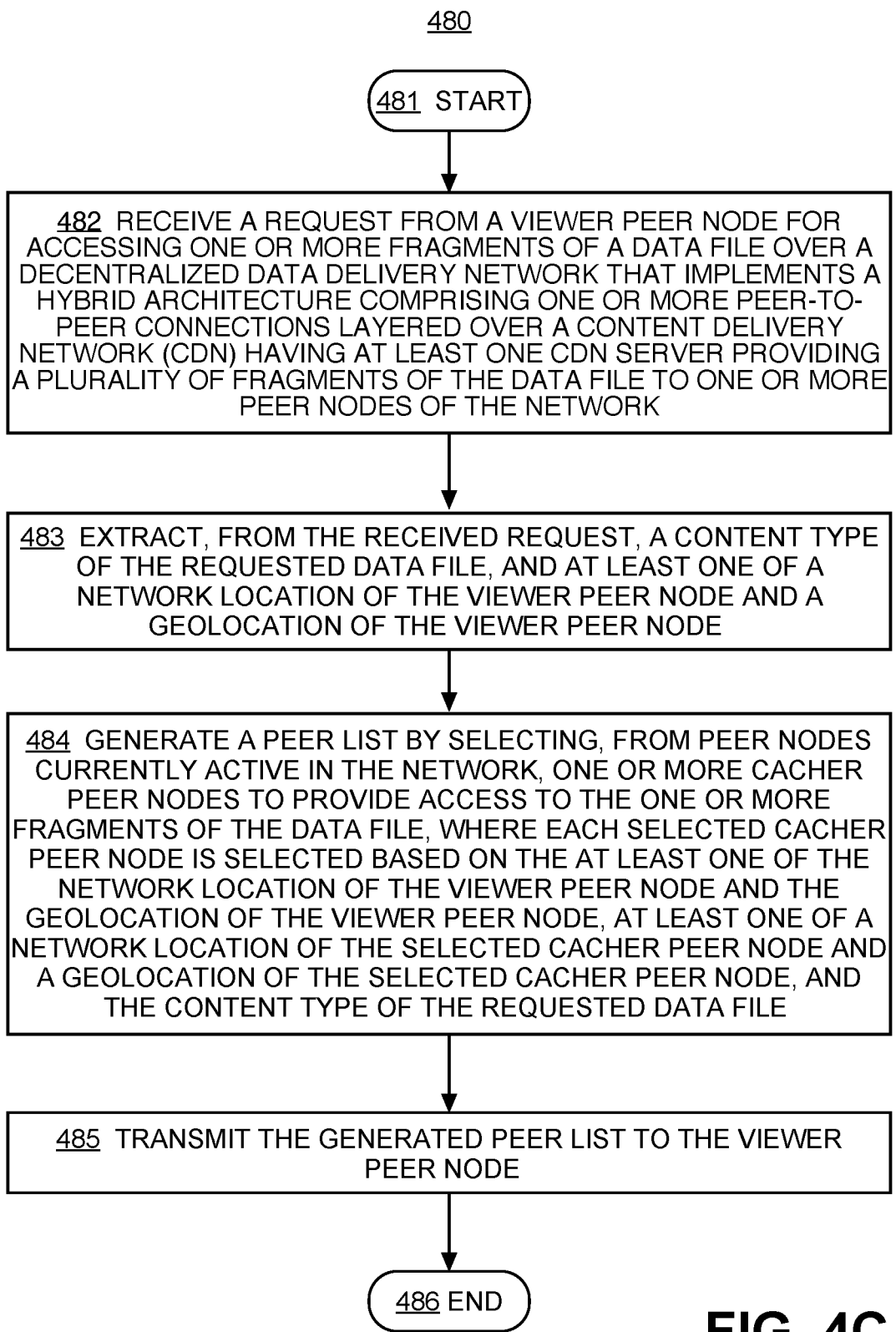
FIG. 4C is a flowchart showing exemplary processes for distributing data fragments within a decentralized data delivery network, according to one embodiment of the present invention.

FIG. 4C is a flowchart 480 showing exemplary processes for distributing data fragments within a decentralized data delivery network, according to one embodiment of the present invention. Such processes may be implemented and run on a smart tracker server. Upon initiation at step 481, a request is received at step 482 from a viewer peer node for accessing one or more fragments of a data file over a decentralized data delivery network that implements a hybrid architecture comprising one or more peer-to-peer (P2P) connections layered over a content delivery network (CDN) having at least one CDN server providing a plurality of fragments of the data file to one or more peer nodes of the network. At step 483, a content type of the requested data file is extracted from the received request. Also extracted is at least one of a network location of the viewer peer node and a geolocation of the viewer peer node. At step 484, a peer list is generated by selecting, from peer nodes currently active in the network, one or more cacher peer nodes to provide access to the one or more fragments of the data file, where each selected cacher peer node is selected based on the at least one of the network location of the viewer peer node and the geolocation of the viewer peer node, at least one of a network location of the selected cacher peer node and a geolocation of the selected cacher peer node, and the content type of the requested data file. At step 485, the generated peer list is transmitted to the viewer peer node. The process terminates at step 486.

Figure 4D:
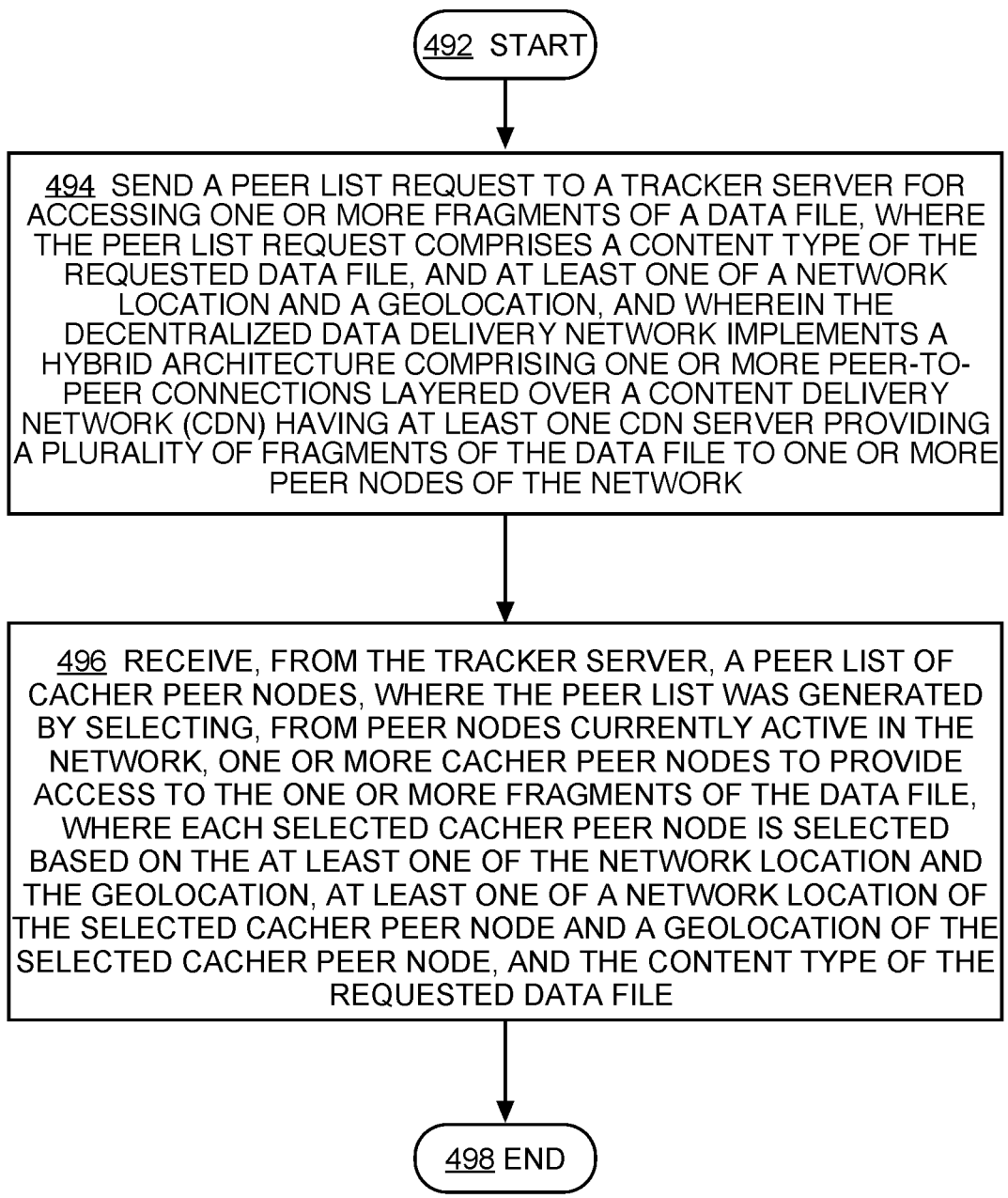
FIG. 4D is another flowchart showing exemplary processes for distributing data fragments within a decentralized data delivery network, according to one embodiment of the present invention.

FIG. 4D is another flowchart 490 showing exemplary processes for distributing data fragments within a decentralized data delivery network, according to one embodiment of the present invention. Such processes may be implemented and run on a viewer node which may also function as a cacher. Upon initiation at step 492, a peer list request is sent at step 494 to a tracker server for accessing one or more fragments of the data file, where the peer list request comprises a content type of the requested data file, and at least one of a network location and a geolocation, and where the decentralized data delivery network implements a hybrid architecture comprising one or more peer-to-peer (P2P) connections layered over a content delivery network (CDN) having at least one CDN server providing a plurality of fragments of the data file to one or more peer nodes of the network. At step 496, a peer list of cacher nodes is received from the tracker server, where the peer list was generated by selecting, from peer nodes currently active in the network, one or more cacher peer nodes to provide access to the one or more fragments of the data file, where each selected cacher peer node is selected based on the at least one of the network location and the geolocation, at least one of a network location of the selected cacher peer node and a geolocation of the selected cacher peer node, and the content type of the requested data file. The process terminates at step 498.

Edge Cacher Software Architecture

Figure 5:
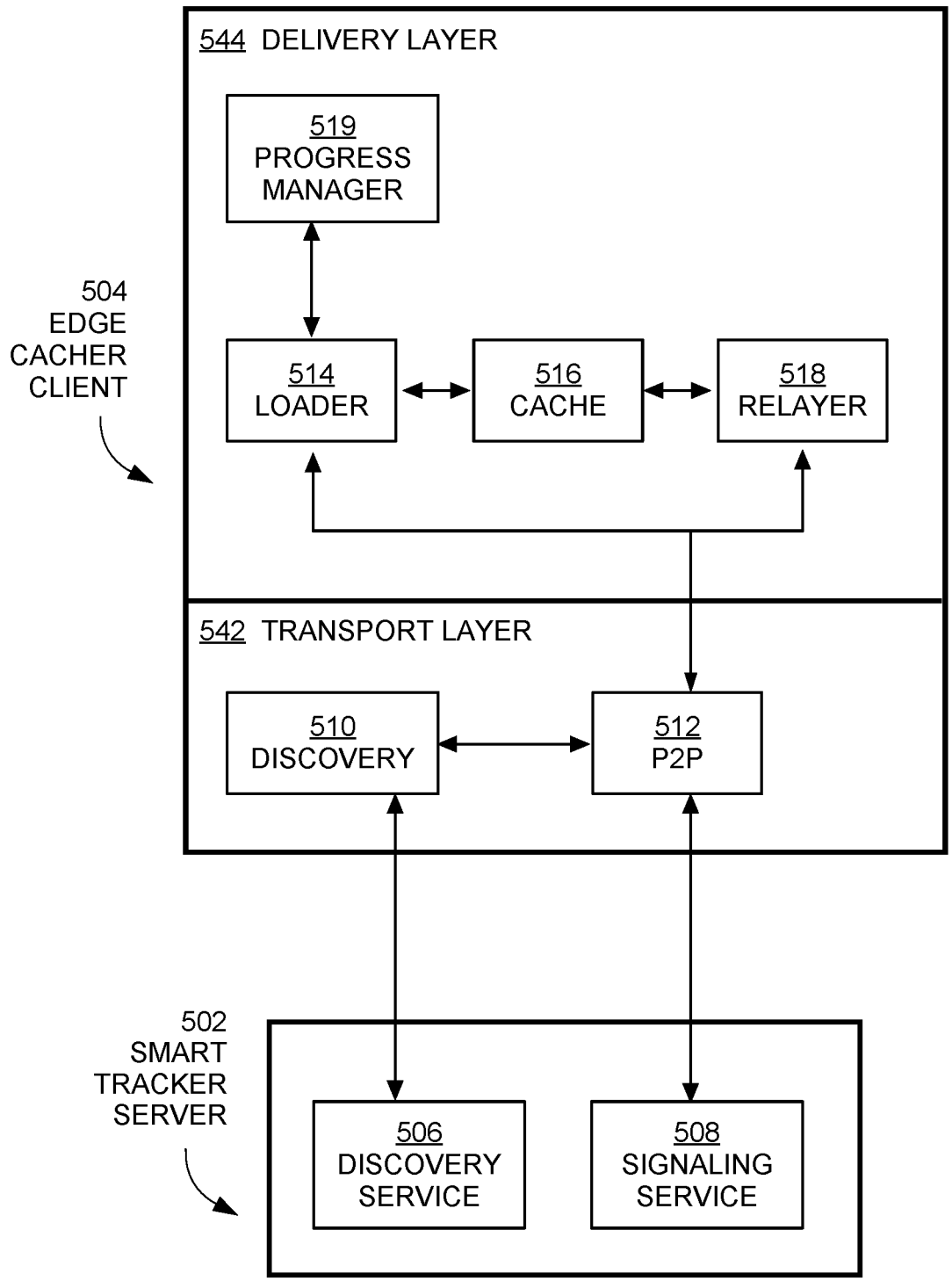
FIG. 5 shows an architecture diagram of an edge cacher client, according to one embodiment of the present invention.

FIG. 5 shows an architecture diagram 500 of an exemplary edge cacher client 504 in accordance with one embodiment of the invention. Also shown is a smart tracker server 502 comprising code for a discovery service 506 and a signaling service 508, both described with reference to FIG. 3.

Edge cacher client 504 is configured to store, transmit, and/or relay data content. It comprises a transport layer 542 and a delivery layer 544. Transport layer 542 comprises program codes or software modules for discovery 510 and for implementing peer-to-peer (P2P) communications 512 of the hybrid network. The hybrid network implementation enables the core functionality of the edge cacher in delivery layer 544. In various embodiments, different edge cacher nodes may support different data transportation protocols, e.g., WebRTC, HTTP/HTTPS, customized Transmission Control Protocol (TCP) and/or User Datagram Protocol (UDP), etc.

Delivery layer 544 comprises programming code or software modules for a loader 514, a cache 516, a relayer 518, and a progress manager 519. Loader 514 loads data file fragments pulled by a P2P entity, e.g., another edge cacher from a CDN server, into cache 516, while relayer 518 distributes the data file fragments from edge cacher client 504 to one or more downstream viewers. In certain embodiments where edge cacher client 504 supports multiple protocols, transport layer 542 may abstract different protocols with the same interface for delivery layer 544. Finally, progress manager 519 in delivery layer 544 monitors and manages the progress in providing the content streams to other network peers.

In some embodiments, loader 514 pulls data fragments from a CDN server directly. In some embodiments, loader 514 may implement both a push and/or a pull model to identify the download source of each desired data fragment. In a push model, a cacher node such as edge cacher 504 may broadcast its local fragment and/or slice list to all its neighbors in a same "swarm," which is a group of edge cacher nodes that share a common attribute, such as a geolocation or a particular content being accessed. For example, the cacher node may connect to other edge cachers and viewers through a web socket, and notifies its neighbors about the fragments/slices available through this web socket, while delivering data through HTTP/HTTPS. In a pull model, the cacher node may query its neighbors for a given data file fragment or slice.

As mentioned above, the various content types that are allowed to be shared on the hybrid network have various latency requirements. A live stream has the most stringent real-time requirement, where any delay needs to be within a tolerable range. Based on information from smart tracker 502, relayer 518 may identify data streams to pull from CDN servers or from other edge cachers. Tracker server 502 may suggest which streams to pull and provide "popularity scores" of the streams. In one example, only a majority bitrate stream or the highest bitrate stream is pulled. In some embodiments, edge cacher 502 continuously pulls live streams from one or more CDN servers when there are sufficient concurrent number of downstream viewers (e.g., 2 or 3 downstream viewers).

A VoD stream has semi-real time delay requirements, and edge cachers such as 504 may be configured to pull VoD contents from each other whenever possible. For static data contents such as data blobs, real-time delivery is desirable but not necessary. A small VoD or a data blob file may be stored as a whole in an edge cacher, whereas large files may be divided into fragments, where each fragment may be stored on different edge cachers, if desired. Smart tracker 502 may determine the optimal distribution of the VoD/data blob file parts, as described in relation to FIG. 3. In addition, when two edge cachers exchange data fragments, tit-for-tat compensation may be used without any currency-based payments.

Viewer Software Architectures

Figure 6:
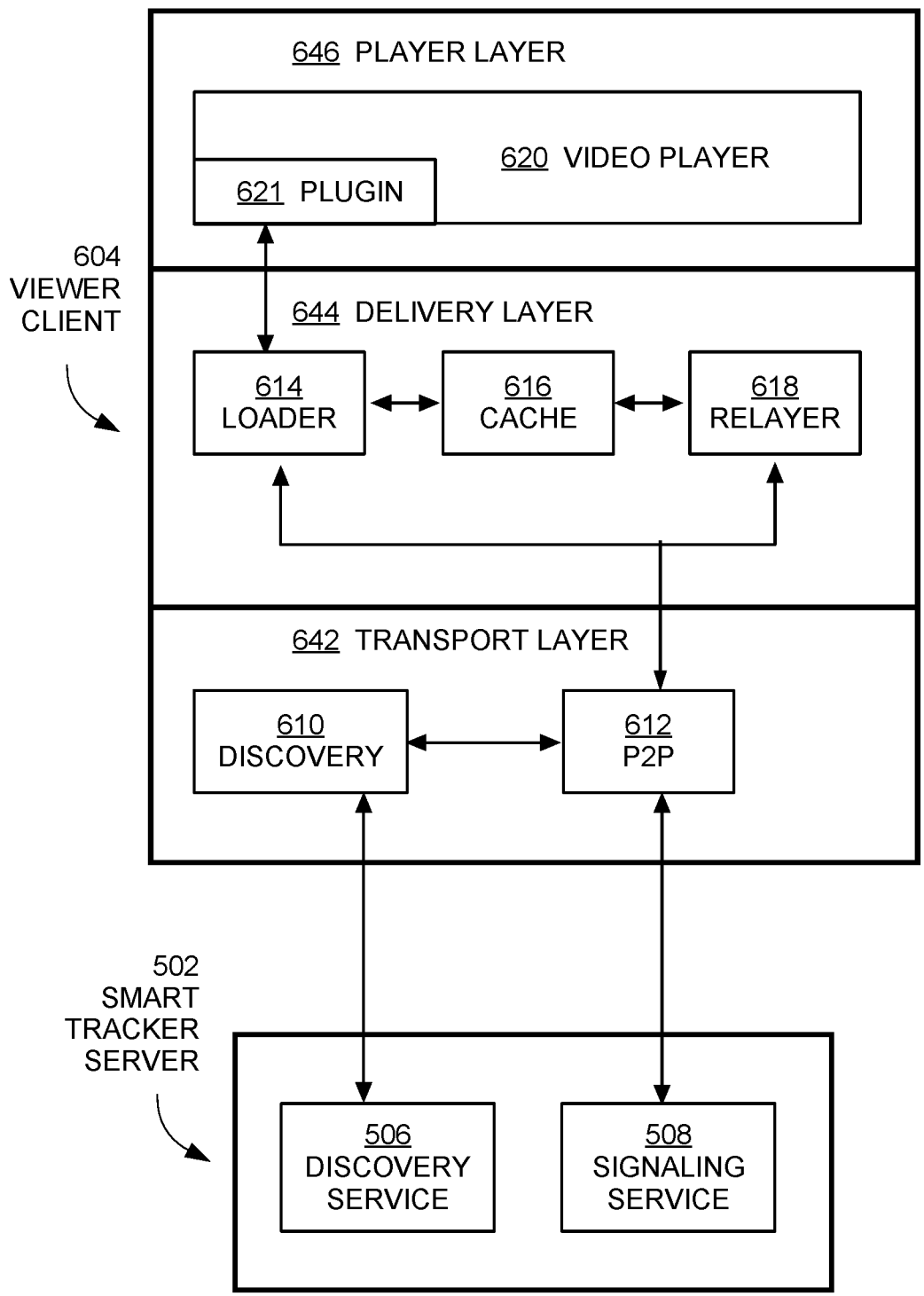
FIG. 6 shows an architecture diagram of a viewer client, according to one embodiment of the present invention.

FIG. 6 shows an architecture diagram 600 of a viewer client 604 in accordance with one embodiment of the invention. Since viewer clients often also implement edge cacher functionalities, there is a significant overlap in the viewer and edge cacher architectures shown in FIGS. 5 and 6. Edge cacher functionalities are implemented through a delivery layer 644 comprising a loader 614, a cache 616, and a relayer 618, and a transport layer 642 comprising a discovery service 610 and a P2P service 612. Player layer 646 is communicatively coupled to delivery layer 644, and delivery layer 644 is communicatively coupled to transport layer 642.

In addition to edge cacher functionalities, viewer client 604 may also implement content viewing functionality. Accordingly, viewer client 604 for a peer node running a viewer software comprises a player layer 646, representative of software applications that use data delivered through transport layer 642 and delivery layer 644, which operate analogously to the edge cacher architecture shown in FIG. 5.

In this exemplary embodiment, player layer 646 comprises a video player 620 and a plugin 621. It will be appreciated that video player 620 is shown in the player layer 646 for illustration purposes only, and that video player 620 can be replaced by any other content viewer depending on the content type being requested by the peer node implementing the viewer software. Video player 620 can be any third party video player that comprises a plugin 621 to access and play the content transmitted by peer nodes on the hybrid network. In some embodiments, video player 620 may be a web app for livestream or VoD content. In some embodiments, a software development kit (SDK) may be implemented for mobile devices, Internet of Things (IoT) devices, and the like.

When SDKs are deployed for mobile devices and IoT device, the SDK may maintain a cache for the stream content such that pulling from different edge cachers is transparent to player 620. The SDK may have separate threads that interact with tracker 502 and other edge cachers to determine what data fragments to pull and where to pull from. The fetched data are then stored in the cache such that player 620 may retrieve the data when needed. In one exemplary embodiments, client video player 620 is a web/HTML5 based player which employs the WebRTC protocol for stream delivery among peers. Deploying web-based players requires minimal effort, where streaming sites and platforms may simply embed the player onto their webpages, for it to instantly "launch" to thousands or even millions of end user nodes in the hybrid network. In another exemplary embodiment, client video player 620 is a standalone client application that can run in the background to facilitate video stream relay even when the end user is not watching any video streams.

Again, the various content types that are allowed to be shared on the hybrid network have various latency requirements. A live stream has the most stringent real-time requirement, where any delay needs to be within a tolerable range. For live streaming, viewer client 604 may implement a push model by transmitting a content index which identifies the fragments/slices of content stored thereon, and a pull model where it requests specific content fragments/slices from other cachers. Popular live streams are likely to reside in another viewer's memory.

When the requested content is VoD, the requested content is unlikely to reside in another viewer unless the viewers are watching the same VoD, which may happen for popular VoDs. Popular VoDs are handled by the hybrid network in a manner similar to live-streamed content. If the requested content is a data blob, then it is likely that the requested content may reside in another cacher or more particularly, in the hard drive of the other cacher, e.g., as a firmware, patch update, and so on. The cacher providing the content needs to ping the smart tracker to keep the connection open if the content is to be served to other network nodes.

In some embodiments, viewer-side intelligence may assist in the process of selecting a peer to retrieve data from. For example, given a list of candidate peers as provided by the tracker server for a live stream currently being played, viewer client 604 may perform a speed and availability test to select a subset that has optimized performance, connectivity, and can reliably provide the video stream segment. Such speed and availability tests may be performed regularly during a live stream session and a neighbor list may be continuously refined, To avoid QoS degradation, local buffer management is critical. The client player may maintain a local cache to buffer the downloaded stream data. If the duration of the cached stream data is less than a certain threshold, the player may check with neighboring peers to see if they have the desired video stream segment. In the event when none of the neighbors has that segment, the player intelligently falls back to the CDN. To achieve the best QoS possible, the player fetches an updated candidate list from the tracker server on a regular basis during the stream session.

A Unified Data Retrieval Framework

Edge cachers and smart trackers together establish a unified framework for data retrieval. A download manager may drive a file download process. In the case of livestream or VoD data delivery, video player 620 may act as a download manager. For other content types, such as firmware or a patch update, a custom puller may be employed for managing the downloads. In the case of a peer node acting as an edge cacher but not a viewer, a custom puller is required for content types including livestream, VoD, or data blobs, as a video player is not executed by the peer node. In some embodiments, edge cachers and/or viewers are configured for parallel download of content slices and fragments. For example, a fragment may be divided into multiple slices and different slices may be downloaded from different cachers in parallel. In another example, if a CDN server supports range requests, then the content may be transmitted as small slices to help reduce latency and increase the offload percentage, since small slices are more likely to be available in neighboring peers and can be downloaded faster.

While downloading, a unified cache lookup strategy may be followed, where the local memory of an edge cacher is first searched for a given slice, and if the slice is not found in local memory, the hard drive of the device implementing or executing the edge cacher is searched. The download manager can therefore have multiple threads to download different parts of the file simultaneously in order to minimize the download time. For example, the download manager may deploy a single thread for livestream or VoD, but multiple threads for data blobs, firmware, or patch updates.

The download source of each fragment can be identified by an edge cacher node by implementing a pull model and/or a push model. Both the pull and push models can implement a content availability index in a lookup table.

Figure 7:
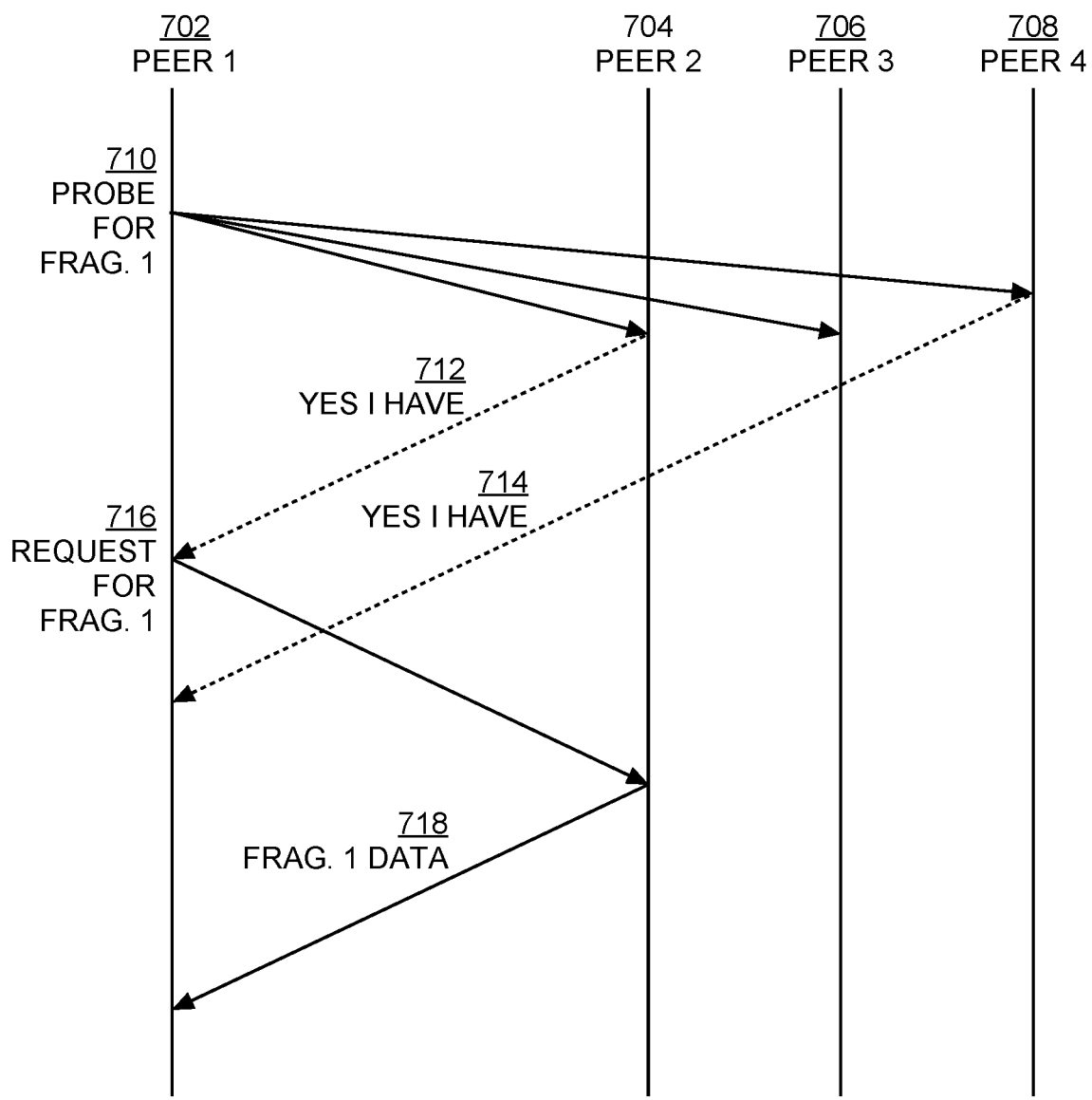
FIG. 7 shows a diagram of a pull model where an edge cacher queries its neighboring nodes for a given data fragment, according to one embodiment of the present invention.

FIG. 7 shows an illustrative timing diagram 700 for an exemplary pull model, a cacher node 702 may query its neighboring nodes 704, 706, and 708, for a given data fragment/slice. Upon broadcasting a probing message 710 for a Fragment 1, cacher 702 waits until one or more affirmative responses 712 and 714 are received from one or more peer cachers 704 and 708 respectively. A request 716 for Fragment 1 may then be sent to the selected peer cacher 704, which in turn transmits data fragment 718 to cacher node 702. More specifically, a custom puller may be used for certain content types such as firmware and patch updates. This custom puller may interact with the tracker and other peer edge cachers to identify the best peer edge cacher to pull the requested data from, based on the peer edge cachers' geolocations, CPU loads, networking conditions, and other relevant characteristics.

Figure 8:
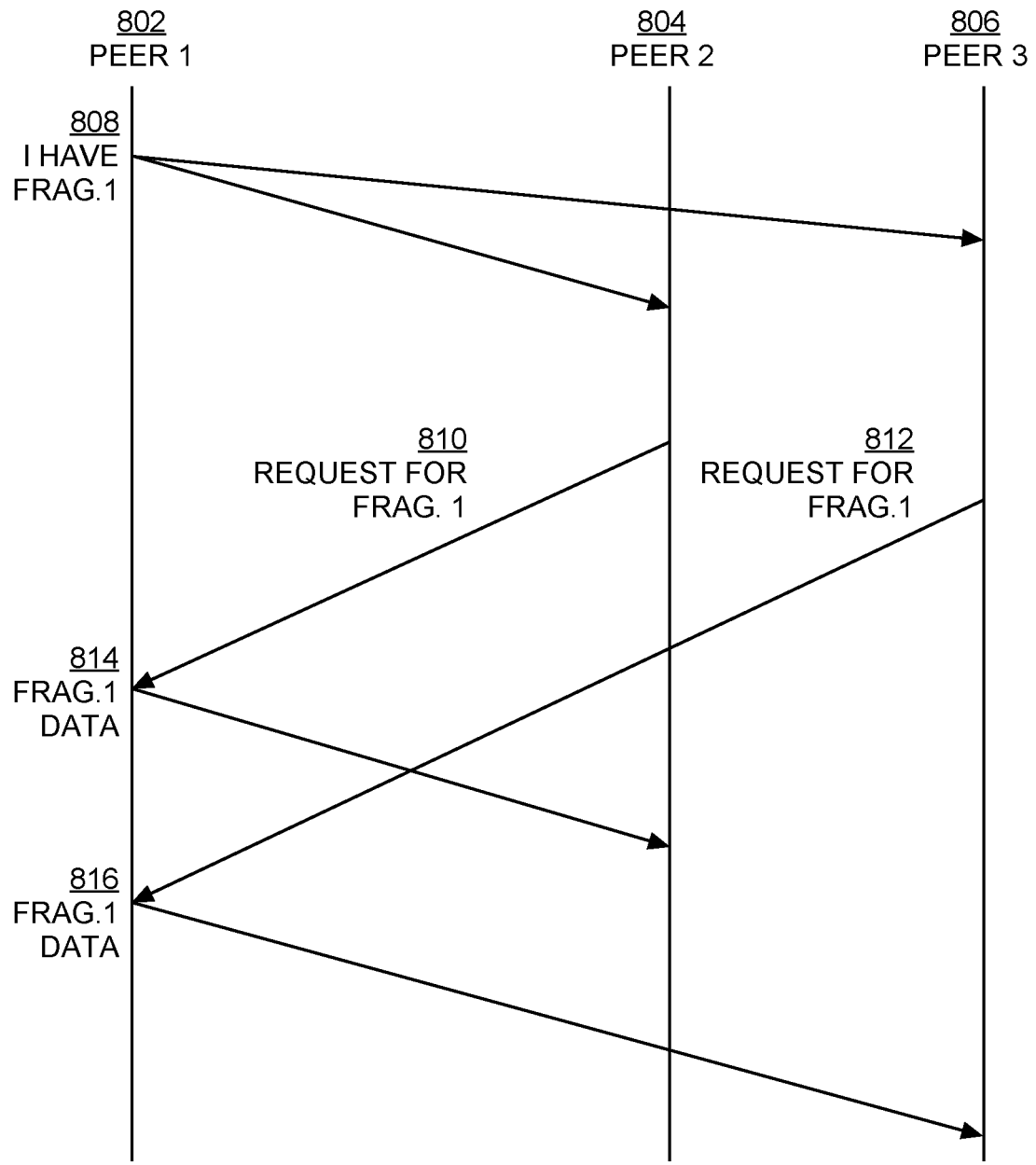
FIG. 8 shows a diagram of a push model where an edge cacher broadcasts its local fragment list to all its neighboring nodes, according to one embodiment of the present invention.

FIG. 8 shows an illustrative a timing diagram 800 for an exemplary push model, a cacher node 802 is configured to broadcast its local fragment and slice list to all its neighboring nodes, 804 and 806 in this example, which are in the same "swarm." A swarm may be a group of edge cacher nodes that share a common attribute, such as a geolocation or a particular content being accessed, and so on. While viewer client 704 in FIG. 7 broadcasts the slice index when it completes the slice download to all its neighbors 704, 706 and 708 through the Web RTC data channel, edge cacher 802 can connect to other edge cacher and viewer nodes through a web socket and notify its neighbors 804 and 806 about fragments/slices available through the web socket. For example, a message 808 may be broadcasted by cacher 802 to peers 804 and 806 about the availability of a Fragment 1. Each of peers 804 and 806 may respond with a request 810 and 812 for Fragment 1 respectively, and cacher 802 may respond with Fragment 1 data 814 and 816 respectively. Similar procedures can be implemented for the edge cacher using the HTTP/HTTPS protocols.

Although not shown explicitly, the hybrid network can support a mixed model as well, where both pull and push models are deployed within the same framework.

THETA Blockchain-Based Ledger System

FIG. 9 shows a block diagram 900 of the various layers within a THETA hybrid network infrastructure in accordance with some embodiments of the present invention. An applications layer 902 comprises user interfaces (UIs) and program code implementing application-level program logic consistent with user expectations of the applications, the THETA JavaScript mesh streaming library to build the hybrid network, and the THETA SDK which is used for integration of the applications with existing players/devices.

A crypto economic infrastructure 904 covers payment process implementation within the hybrid network, including payment server 210, which facilitates payments between viewers and edge cachers. A set of API/libraries are provided for developers to build crypto wallets, including the client side and the server side software infrastructure. A cacher software/library may also be provided for building a WebRTC-based desktop client.

The THETA protocol layer 906 comprises a delivery protocol 908 and a ledger protocol 910. Delivery protocol 908 comprises a smart tracker server which determines the streaming method/bandwidth sharing strategy among peer nodes of the network. Ledger protocol 910 comprises a consensus engine, and transaction throughput handling modules, including on-chain or off-chain transactions. More details on the THETA public ledger blockchain and resource-orientated micropayment pool are discussed next.

More specifically, to encourage and incentivize peer nodes to contribute their computing, bandwidth, and storage resources, a payment or reward system may be setup, where caching nodes earn rewards as they relay video streams or other data files to other viewers. Such a payment system may also greatly improve the streaming market efficiency, by allowing advertisers to engage viewers directly, and by providing streaming and content platforms with new and incremental revenue opportunities.

While traditional payment processing solutions may be considered for facilitating the above mentioned reward system, a secure and minimally delayed alternative that is naturally compatible with decentralized data streaming and delivery is a decentralized, distributed, public ledger payment service system, for example, based on a blockchain. A blockchain is a list of public transaction records, or blocks, linked through cryptography, and typically managed by a peer-to-peer network with protocols for inter-node communication and block validations. While conventional payment systems require a central authority to verify and clear transactions to maintain trust, a blockchain ledger system achieves global, decentralized consensus without such a central authority. A blockchain is immutable, where modifications to transaction data is near impossible, a property making it suitable for use by cryptocurrencies as a payment method in the above mentioned reward system.

A blockchain-based public ledger system is a decentralized, public database of transactions, which are records that encode the transfer of value from one user to another. Transactions are bundled into blocks, and each block is validated through a cryptographic computational process called mining, and based on a set of consensus rules followed by all nodes of the blockchain network.

Unlike centralized video streaming platforms where viewers pay directly into a central server in the form of a subscription or on a pay-per-view basis, the alternative of compensating multiple peers each providing small segments of video data to multiple other peers in a peer-to-peer network presents a significant scaling problem. Typical video segments are only a few seconds long, and to pay at such granularity, for a live stream with even just a moderate number of ten thousand concurrent viewers could generate thousands of transactions per second, far exceeding the maximum throughput of today's public blockchains. Popular live streams like major esport tournaments can attract more than one million viewers watching one stream simultaneously, not to mention multiple concurrent live streams, which could potentially push the required transaction throughput further to the range of millions per second.

To overcome the above mentioned difficulties, a novel, decentralized public ledger system, the THETA blockchain based ledger system, is proposed and implemented for decentralized data streaming and delivery. For example, blockchain 390 shown in FIG. 3 may be implemented on a THETA token mining network according to the THETA protocol, which builds upon the following three novel designs.

First, a multi-level Byzantine Fault Tolerant (BFT) consensus mechanism is employed, allowing thousands of nodes to participate in the consensus process while still supporting very high transaction throughput, for example, in the range of 1,000+ transactions per second. Data streaming applications typically require fast consensus. For bandwidth sharing rewards, users who contribute redundant bandwidth typically want the payment to be confirmed before sending the next data segment. To minimize transaction confirmation delays, the THETA protocol uses a small set of nodes to form a validator committee, producing a chain of blocks as fast as possible using a practical BFT (PBFT)-like process. With a sufficient number of validators such as 10 to 20 nodes, the validator committee may produce blocks at a fast speed, while still retaining a high degree of difficulty to prevent an adversary from compromising the integrity of the blockchain. A transaction is "committed" once it is included in a new block. To be eligible to join the validator committee, a node may lock up a certain amount of stake for a period of time. The locked stake could be slashed if malicious behavior is detected. The blocks that the committee reaches consensus on are called settled blocks, and the process by which they produce a chain of blocks is called the block settlement process.

Next, thousands of consensus participants called guardian nodes may validate and finalize the chain generated by the validator committee at checkpoint blocks. The guardian network is a super set of the validator committee, where a validator is also a guardian. With a certain amount of token lockup for a period of time, any node in the network may instantly become a guardian. The guardians may download and examine the chain of blocks generated by the validator committee and try to reach consensus on the checkpoints. "Finalization" refers to convincing each honest guardian that more than a certain portion (e.g., $2/3$) of all the other guardians see the same chain of blocks. Blocks that the guardian nodes have reached consensus on are called finalized blocks, and the process by which they finalize the chain of blocks is called the block finalization process. Checkpoint blocks are a selected subset of blocks that satisfy a given set of conditions, for example, whose height are a multiple of some integer. This "leapfrogging" finalization strategy leverages the immutability characteristic of the blockchain data structure, where as long as two guardian nodes agree on the hash of a block, with overwhelming probability, they will have exactly the same copy of the entire blockchain up to that block. The validator/guardian division provides multiple levels of security guarantee. The validator committee provides a first level of consensus and the guardian pool forms a second line of defense. With thousands of nodes, it is substantially more difficult to compromise the integrity of the network, and thus provides a much higher level of security. This consensus mechanism achieves a good balance among transaction throughput, consistency, and level of decentralization.

Second, the THETA blockchain uses an aggregated signature gossip scheme to significantly reduce messaging complexity. Each guardian node keeps combining partially aggregated signatures from all its neighbors, and then gossips out the aggregated signature. This way the signature share of each node can reach other nodes at an exponential rate. In addition, signature aggregation keeps the size of the node-to-node messages small, and thus further reduces communication overhead.

Third, the THETA blockchain offers an off-chain "Resource-Orientated Micropayment Pool" for data content streaming and delivery. An off-chain micropayment pool enables one-to-many and many-to-one payments using off-chain transactions. For video streaming, a viewer can pay for video content pulled from multiple cachers, and a cacher can be paid for delivering video data to multiple viewers, all with only limited number of on-chain transactions. Moving significant amount of transactions off-line can significantly improve the scalability of the blockchain.

Furthermore, the THETA ledger system addresses several challenges unique to data streaming applications. First, the THETA ledger system supports ultra-high transaction throughput. While many blockchain projects are facing transaction throughput problems, scaling for live video streaming is different and possibly even more complex. At the granularity of a token reward micropayment per video segment, for popular esport tournaments where multiple live streams often are established with millions of concurrent viewers, millions of micro-transactions can be generated per second, far exceeding the maximum throughput of today's public chains, such as Bitcoin and Ethereum. New generations of blockchain solutions like DFINITY and ZILLIQA are reported to handle thousands or even tens of thousands of on-chain transactions per second. Yet millions of transactions per second is still a far-fetched goal for these other systems. To get closer, level-two scalability solutions such as payment networks may be one option to pursue. A payment network refers to a class of techniques designed to allow users to make multiple transactions without committing all of the transactions to the blockchain, and to improve the scalability of the underlying blockchain. Nonetheless, such payment networks rely on underlying payment channels and/or intermediate exchanges, as well as dedicated payment routing paths, with cumulative latencies and complexities. Instead, the THETA ledger system provides a novel and innovative solution in the form of off-chain scaling via a "resource oriented micropayment pool," which amplifies the supportable throughput by several order of magnitudes.

Second, a byproduct of high transaction throughput is rapidly growing storage consumption, and storing micropayment transactions is highly storage demanding. With millions of transactions added to a ledger every second, the storage space of an ordinary computer could run out quickly. The THETA ledger system decreases the number of transactions need to be stored in the blockchain by moving most micropayment transactions off-chain.

Third, the THETA ledger system may incorporate a collateral to prevent double-spending. That is, double spending can be detected, and the net value that a double spender gets can be made strictly negative under all scenarios. In some embodiments, micropayment may be made without trust, with the maximum risk being the loss of a very limited number of micropayments such as that for a single packet of data.

Many-to-One Micropayment Processing for Video Platform Engagement in P2P Streaming The THETA ledger system implemented according to the present invention facilitates P2P streaming and data delivery from multiple caching nodes to a viewer node, from a caching node to multiple viewers, and has further utility and functionality on video platforms. For example, end-user viewers may gift content providers and popular influencers directly, or purchase virtual items and goods which can then be gifted to influencers. Advertisers and brand sponsors may also fund their advertising campaigns to automatically reward influencers whose video streams these advertisements will be displayed in, and optionally, advertisers may reward viewers for their attention to the stream content and advertisements. End-users may also purchase premium content, virtual goods and other paid products and services.

Moreover, video platform may encourage its users to share bandwidth by paying users based on the bandwidth shared. In an illustrative example, Alice may share data with peers Bob, Carol, and David, etc., and the video platform may reward Alice cryptocurrency tokens through a micropayment pool, with the processing protocol described below, according to one embodiment of the present invention. In this illustrative embodiment, a payment service module such as 210 in FIGS. 2 and 3 may verify signed service receipts and tracker authorizations, and send updated off-chain transactions to relay/cache nodes for eventual on-chain settlements.

Figure 10:
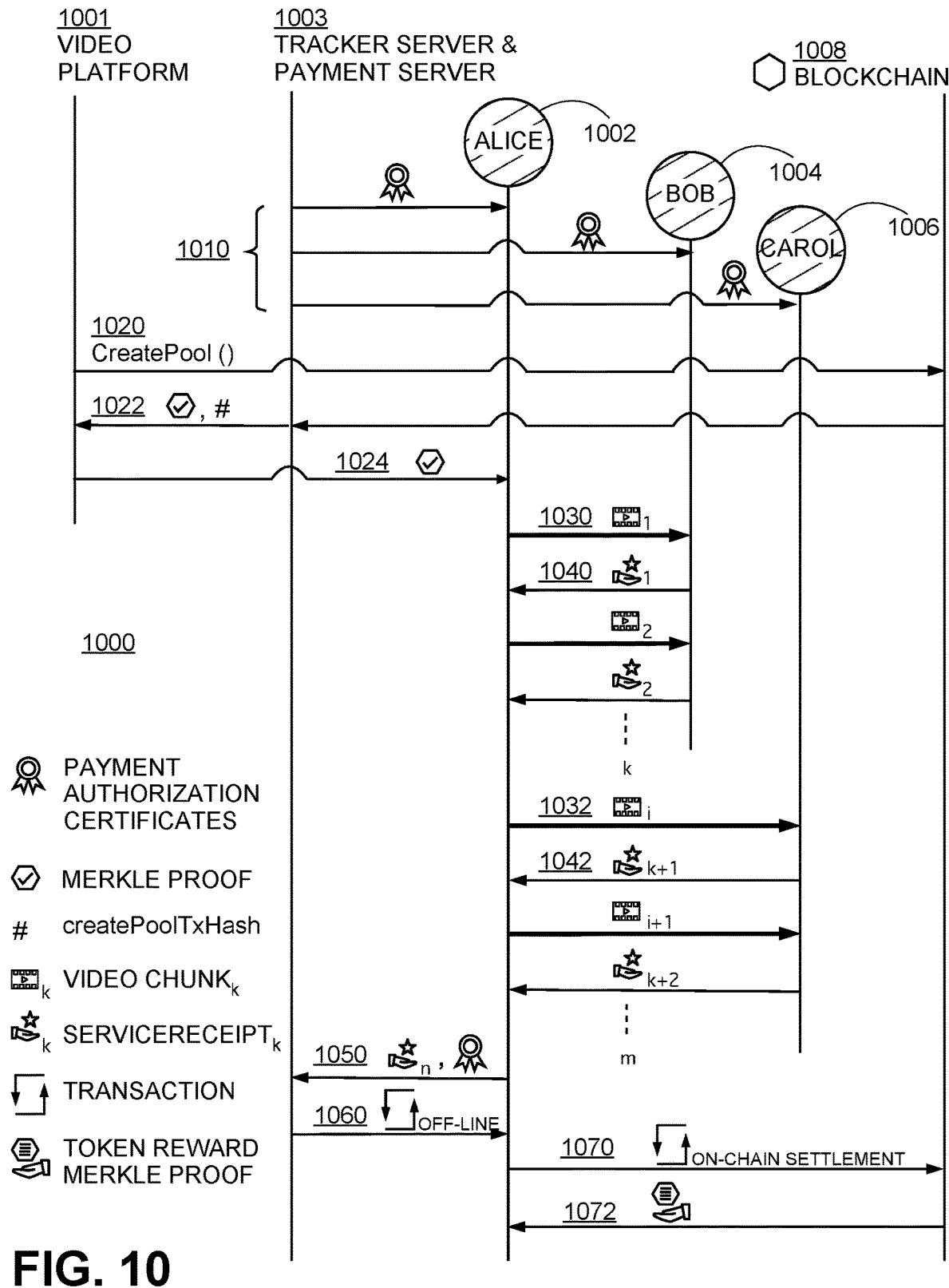
FIG. 10 is a diagram illustrating transactions through a resource-orientated micropayment pool established by a content distributor, showing an edge casher receiving off-chain payments from multiple viewers, according to some embodiments of the present invention.

FIG. 10 is a diagram 1000 illustrating transactions through a resource-orientated micropayment pool established by a content distributor or video platform 1001, showing an edge cacher 1002 Alice ("peer A") receiving off-chain payments for delivering data content to multiple viewers, including 1004 Bob and 1006 Carol, according to some embodiments of the present invention. In this particular example, the following steps are performed.

Step 1. Establishing a peer group for data sharing: A tracker and payment server 1003 peers viewers 1002, 1004, and 1006 together into a group and gives one or more payment authorization certificates 1010 to each participating peer. For example, an authorization certificate auth(Alice, Bob) may be given to Alice, which ensures that peers or viewers can only exchange payments within the viewer group that the tracker server establishes. As discussed previously with reference to FIG. 3, a payment server or payment service module may be co-located with a tracker server or tracker service module. A payment server may also be run directly by video platform 901.

Step 2. Micropayment pool creation: video platform 1001 may create a micropayment pool with a time-lock and a slashable collateral with the payment service module, using the following exemplary command 1020:

CreatePool(resourceId, deposit, collateral, duration).

Again, to create the pool, video platform 1001 specifies a "Resource ID" resourceId that uniquely represents the digital content to be retrieved. It may refer to a video file, or a live stream. The deposit amount needs to be at least the total value of the resource to be retrieved. For instance, if the resource is a video file which is worth 10 tokens, then the deposit would be at least 10 tokens. The collateral is required to discourage double spending. If a double spending attempt is detected by validators of the blockchain network, the collateral may be slashed. The duration is a time-lock similar to that of a standard payment channel. Any withdrawal from the payment pool has to be before the time-lock expires. In the case of a live stream, a deleted deposit may be automatically re-filled to avoid any double spend confusion.

With the goal of video platform 1001 rewarding its viewers for bandwidth sharing, payment server or payment service module 1003 here may be maintained by a third party, to provide token custody service for video platform 1001. Video platform 1001 may purchase cryptocurrencies from the market, and store purchased tokens in the payment server. When video platform 1001 needs to submit the funding transaction, it may call an API provided by payment server 1003 to initiate the process. In some other embodiments, video platform 1001 may run payment server 1003 directly, and the funding transaction submission may be implemented as an internal call.

After the funding transaction has been committed, payment server 1003 returns information 1022 to video platform 1001, including the Merkle proof of the CreatePool( ) transaction after it has been committed, as well as createPoolTxHash, the transaction hash of the CreatePool( ) transaction. Video platform 1001 passes the Merkle proof to Alice in a notification message 1024 so Alice is aware of the creation of the micropayment pool. In some embodiments, the notification message may contain other data types and/or structures instead.

Step 3. Data sharing: Alice shares data 1030 with peer Bob, and data 1032 with peer Carol, concurrently or asynchronously. Data 1030 and 1032 may each be a portion of the digital content data resource previously specified. For example, they may each be a fragment or slice of a video file, a single data packet, a live stream segment, and the like.

Step 4. Off-chain micropayments: Bob signs a ServiceReceipt 1040 and sends it to Alice off-chain in exchange for the parts of the specified resource. Similarly, Carol signs a ServiceReceipt 1042 and sends it back to Alice off-chain.

Step 5. Micropayment receipt submission: When Alice receives a micropayment receipt from peers it has served, Alice submits the micropayment receipt to payment server 1003 along with the authorization certificate, as upload data 1050. Payment server 1003 needs to verify 1) the ServiceReceipts signed by each peer, and 2) the tracker server has authorized sharing between each peer and Alice.

Step 6. On-chain settlement: payment server 1003 sends Alice an updated off-chain transaction 1060 which accumulates the total payment Alice has received so far, so Alice can submit it as an on-chain transaction 1070 to the blockchain anytime and claim the updated balance of the reward 1072. Transaction 1060 may contain the following data:

targetAddress, transferAmount, createPoolTxHash, targetSettlementSequence, Sign($SK_A$, targetAddress∥transferAmount∥createPoolTxHash∥targetSettlementSequence).

For the on-chain settlement, either the video platform or Alice can periodically publish the signed transactions to the blockchain any time before the timelock expires to reward Alice with the tokens. ServicePayment transactions that are published may be called "on-chain settlement" transactions.

Again, gas fee needs to be paid for the on-chain settlement transaction. Paying less transaction fees is a strong incentive to publish on-chain settlements only when necessary, which is beneficial to the scalability of the network.

Also, no on-chain transaction is needed when Alice shares a video stream with multiple peers simultaneously. In the video streaming context, this means the viewer can switch to any caching node at any time without making an on-chain transaction that could potentially block or delay the video stream delivery.

Additionally, in some embodiments, payment flow can run without trust for double spending. A peer may only provide the data-sharing service when he sees the micropayment pool is created in the blockchain. Subsequently, for each data packet, the peer may check if the video platform/payment server signs the corresponding micropayment transaction. If the peer detects a failure to sign a micropayment, it can stop bandwidth sharing. Thus, the peer may risk a single micropayment. Since each incremental micropayment may be infinitesimally small in theory, this loss may be made arbitrarily small. Alternatively, the peer may only send a data packet after receiving a signed payment for that packet, with the risk of loss borne by the video platform instead.

The use of a resource-orientated micropayment pool has shown significant performance gains in handling high-throughput micropayments. In one particular implementation of a livestream platform employing such a micropayment pool, on a daily basis, more than 100,000 aggregated on-chain payment transactions may be handled, whereas each on-chain transaction corresponds to about 30 to 40 off-chain micropayments on average. Thus, 3 to 4 million micropayments may be processed, yet this is still far below the achievable throughput limit the system is designed for.

Implementation Using Computer Program Products, Methods, and Computing Entities

Exemplary System Architecture

Figure 11:
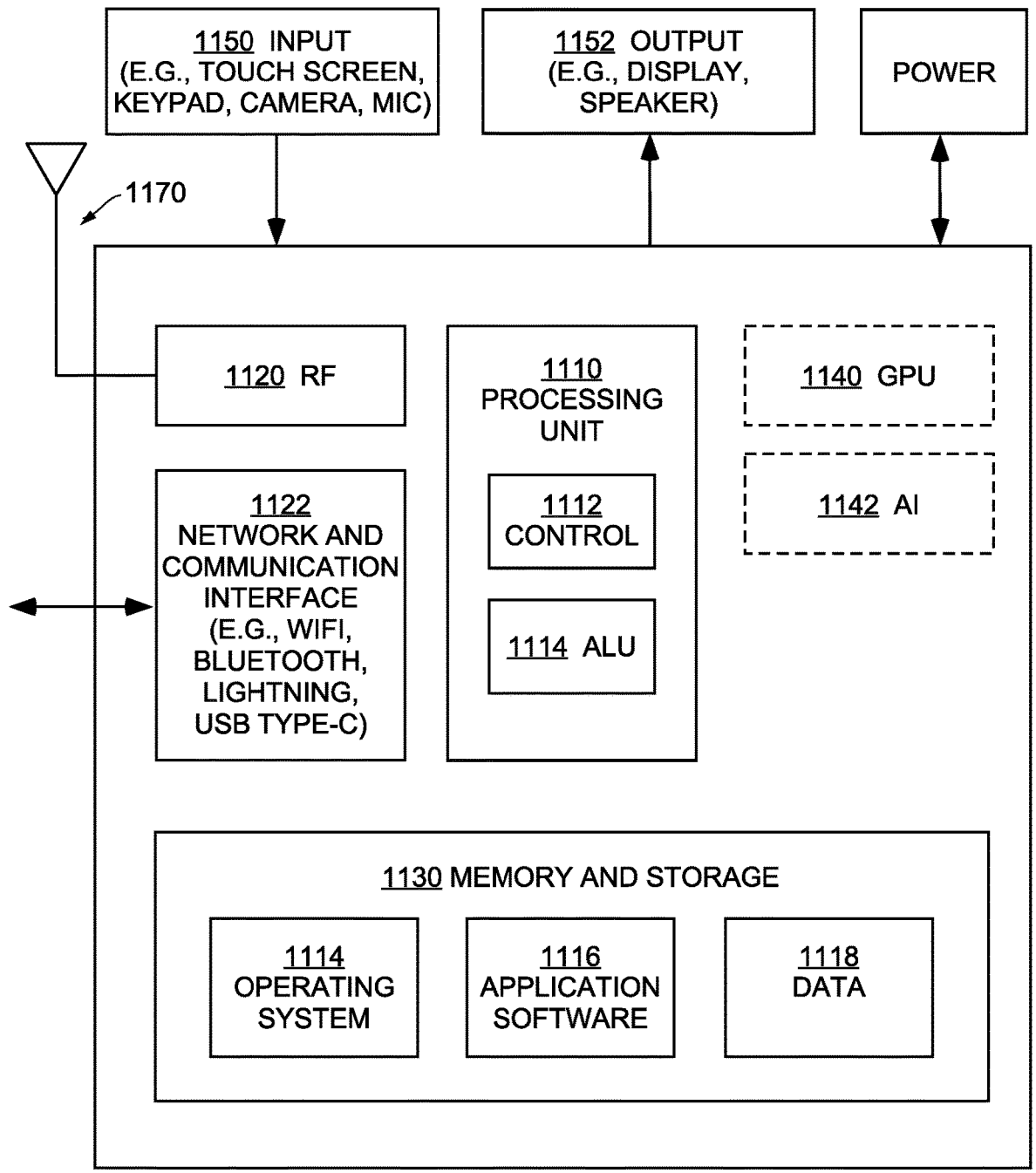
FIG. 11 is an exemplary schematic diagram of a user computing entity for implementing a viewer or cacher node, according to exemplary embodiments of the present invention.
Figure 12:
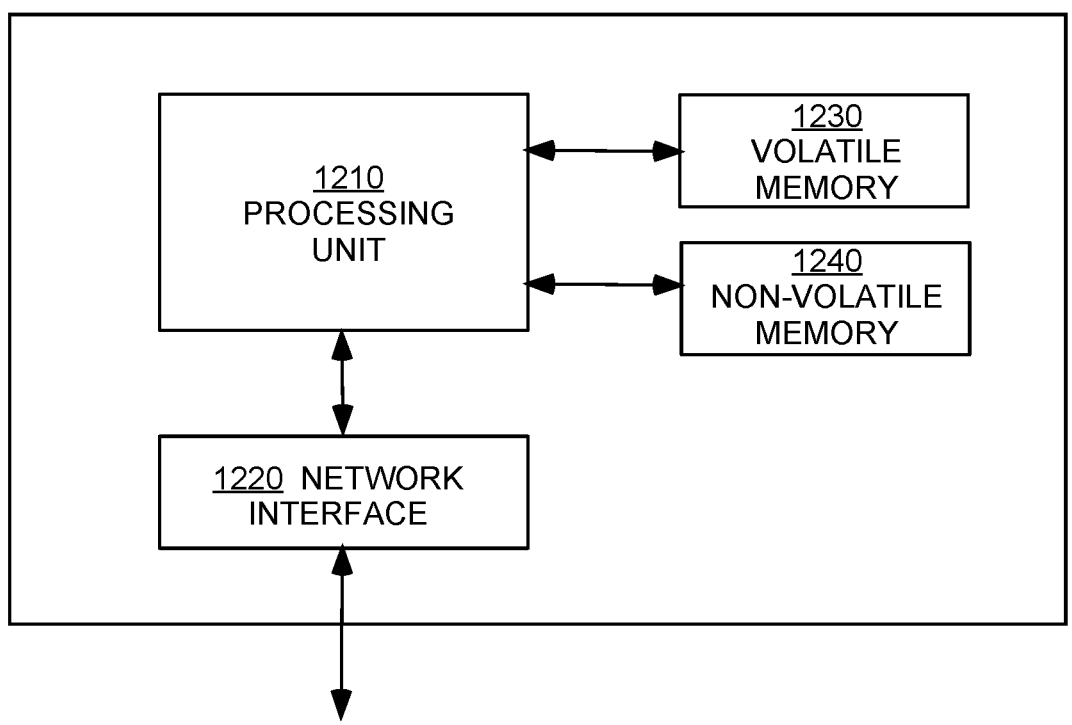
FIG. 12 is an exemplary schematic diagram of a management computing entity for implementing a server, according to exemplary embodiments of the present invention.

An exemplary embodiment of the present disclosure may include one or more end user computing entities 1100, one or more networks, and one or more CDN, tracker server, payment server, or other management computing entities 1200, as shown in FIGS. 11 and 12. Each of these components, entities, devices, systems, and similar words used herein interchangeably may be in direct or indirect communication with, for example, one another over the same or different wired or wireless networks. Additionally, while FIGS. 11 and 12 illustrate the various system entities as separate, standalone entities, the various embodiments are not limited to this particular architecture.

Exemplary User Computing Entity

FIG. 11 is an exemplary schematic diagram of an end user computing device for implementing a viewer node or a cacher node, according to exemplary embodiments of the present invention. An end user computing device 1100 capable of viewing or caching streamed video includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a content server, tracker, or payment server may be implemented according to the exemplary schematic diagram shown in FIG. 12, possibly in the cloud, and possibly with logically or physically distributed architectures.

As shown in FIG. 11, user computing entity 1100 may include an antenna 1170, a radio transceiver 1120, and a processing unit 1110 that provides signals to and receives signals from the transceiver. The signals provided to and received from the transceiver may include signaling information in accordance with air interface standards of applicable wireless systems. In this regard, user computing entity 1000 may be capable of operating with one or more air interface standards, communication protocols, modulation types, and access types. More particularly, user computing entity 1100 may operate in accordance with any of a number of wireless communication standards and protocols. In some embodiments, user computing entity 1100 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 1100 may operate in accordance with multiple wired communication standards and protocols, via a network and communication interface 1122.

Via these communication standards and protocols, user computing entity 1100 can communicate with various other computing entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). User computing entity 600 can also download changes, add-ons, and updates, for instance, to its firmware, software (e.g., including executable instructions, applications, program modules), and operating system.

In some implementations, processing unit 1110 may be embodied in several different ways. For example, processing unit 1110 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1110 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1110 may be configured for a particular use or configured to execute instructions stored in volatile or non-volatile media or otherwise accessible to the processing unit. As such, whether configured by hardware or computer program products, or by a combination thereof, processing unit 1110 may be capable of performing steps or operations according to embodiments of the present invention when configured accordingly.

In some embodiments, processing unit 1110 may comprise a control unit 1112 and a dedicated arithmetic logic unit 1114 (ALU) to perform arithmetic and logic operations. In some embodiments, user computing entity 1100 may optionally comprise a graphics processing unit 1140 (GPU) for specialized image and video rendering tasks, and/or an artificial intelligence (AI) accelerator 1142, specialized for applications including artificial neural networks, machine vision, and machine learning. In some embodiments, processing unit 1110 may be coupled with GPU 1140 and/or AI accelerator 1142 to distribute and coordinate processing tasks.

In some embodiments, user computing entity 1100 may include a user interface, comprising an input interface 1150 and an output interface 1152, each coupled to processing unit 1110. User input interface 1150 may comprise any of a number of devices or interfaces allowing the user computing entity 1100 to receive data, such as a keypad (hard or soft), a touch display, a mic for voice/speech, and a camera for motion or posture interfaces. User output interface 1152 may comprise any of a number of devices or interfaces allowing user computing entity 1100 to provide content and information to a user, such as through a touch display, or a speaker for audio outputs. In some embodiments, output interface 1152 may connect user computing entity 1100 to an external loudspeaker or projector, for audio or visual output.

User computing entity 1100 may also include volatile and/or non-volatile storage or memory 1130, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1114, application software 1116, data 1118, databases, database instances, database management systems, programs, program modules, SDKs, scripts, source code, object code, byte code, compiled code, interpreted code, machine code, executable instructions, and/or the like to implement the functions of user computing entity 1100. As indicated, this may include a user application that is resident on the entity or accessible through a browser or other user interface for communicating with a management computing entity and/or various other computing entities.

In some embodiments, user computing entity 1100 may include location determining aspects, devices, modules, functionalities, and/or similar words used herein interchangeably. For example, user computing entity 1100 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1100 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any peer-to-peer protocols including BitTorrent, or that provided by the THETA hybrid network. In some embodiments, the user computing devices may use a network interface such as 1122 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 12 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 12 is an exemplary schematic diagram of a management computing entity 1200, such as a CDN or tracker server, for implementing the THETA network, according to exemplary embodiments of the present invention. The terms computing entity, computer, entity, device, system, and/or similar words used herein interchangeably are explained in detailed with reference to user computing entity 1100.

As indicated, in one embodiment, management computing entity 1200 may include one or more network or communications interface 1220 for communicating with various computing entities, such as by communicating data, content, information, and/or similar terms used herein interchangeably that can be transmitted, received, operated on, processed, displayed, stored, and/or the like. For instance, management computing entity 1200 may communicate with user computing device 1100 and/or a variety of other computing entities. Network or communications interface 1220 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1200 may be configured to communicate via wireless external communication networks using any of a variety of standards and protocols as discussed with reference to user computing device 1100.

As shown in FIG. 12, in one embodiment, management computing entity 1200 may include or be in communication with one or more processing unit 1210 (also referred to as processors, processing circuitry, processing element, and/or similar terms used herein interchangeably) that communicate with other elements within the management computing entity 1200. As will be understood, processing unit 1210 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1210 may be configured for a particular use or configured to execute instructions stored in volatile or non-volatile media 1230 and 1240. As such, whether configured by hardware or computer program products, or by a combination thereof, processing unit 1210 may be capable of performing steps or operations according to embodiments of the present disclosure when configured accordingly.

Although not shown explicitly, management computing entity 1200 may include or be in communication with one or more input elements, such as a keyboard, a mouse, a touch screen/display, a camera for motion and movement input, a mic for audio input, a joystick, and/or the like. Management computing entity 1200 may also include or be in communication with one or more output elements such as speaker, screen/display, and/or the like.

In various embodiments, one or more of the components of management computing entity 1200 may be located remotely from other management computing entity components, such as in a distributed system or in the cloud. Furthermore, one or more of the components may be combined and additional components performing functions described herein may be included in the management computing entity 1200.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method utilized by a tracker server for distributing a data file within a decentralized data delivery network, comprising:
   receiving a client statistic from a first cacher peer node, wherein the client statistic comprises a first location of the first cacher peer node and a performance specification of the first cacher peer node, and wherein the decentralized data delivery network implements a hybrid architecture comprising one or more peer-to-peer (P2P) connections layered over a content delivery network (CDN) having at least one CDN server providing a first plurality of fragments of the data file to the first cacher peer node;
   sending a caching instruction to the first cacher peer node to download a subset of the first plurality of fragments of the data file from the CDN server, wherein the caching instruction is generated based on the client statistic;
   receiving a request from a viewer peer node in the decentralized data delivery network for accessing one or more target fragments of the data file;
   extracting, from the received request, a content type of the requested data file, and a second location of the viewer peer node;
   generating a cacher peer list by selecting, from cacher peer nodes currently active in the decentralized data delivery network, one or more cacher peer nodes to provide access to the one or more target fragments of the data file, wherein at least one selected cacher peer node is selected based on the second location of the viewer peer node, a third location of the at least one selected cacher peer node, and the content type of the requested data file; and
   transmitting the generated cacher peer list to the viewer peer node.

2. The computer-implemented method of claim 1, further comprising:
   generating a popularity score for the data file, wherein the content type of the data file is a live data stream, and wherein the caching instructions is generated further based on the popularity score.

3. The computer-implemented method of claim 1, further comprising:
   determining an optimal distribution of a second plurality of fragments of the data file to two or more cacher peer nodes of the network,
      wherein the content type of the requested data file is selected from the group consisting of video-on-demand (VOD) and a binary large object (BLOB), and
      wherein the optimal distribution defines which of the second plurality of fragments of the data file each of the two or more cacher peer nodes should download from the CDN server.

4. The computer-implemented method of claim 1, wherein the at least one selected cacher peer node in the cacher peer list caches at least one of the plurality of one or more target fragments of the data file.

5. The computer-implemented method of claim 1, further comprising:
   sending payment authorization certificates to the at least one selected cacher peer nodes on the cacher peer list, to authorize the sharing of the data file to the viewer peer node;
   receiving a service receipt from the at least one selected cacher peer node on the cacher peer list, wherein the service receipt was signed by the viewer peer node after receiving at least one of the one or more target fragments of the data file from the at least one selected cacher peer node; and
   sending, to the at least one selected cacher peer node, an updated off-chain transaction that accumulates a total payment amount including a payment amount for the at least one of the one or more target fragments of the data file.

6. The computer-implemented method of claim 1, wherein the second location of the viewer peer node is selected from the group consisting of a network location represented by an IP address, and a geolocation represented by a latitude and a longitude.

7. The computer-implemented method of claim 1, wherein the caching instruction is generated further based on a content priority of the data file.

8. The computer-implemented method of claim 1, wherein the viewer peer node comprises a Software Development Kit (SDK) integrated with an existing content viewer, and wherein the SDK generates the request for accessing the one or more target fragments of the data file, and wherein the SDK receives the generated cacher peer list.

9. The computer-implemented method of claim 1, wherein the first cacher peer node comprises a Software Development Kit (SDK) integrated with an existing content viewer, and wherein the SDK downloads the subset of the first plurality of fragments of the data file from the CDN server in response to receiving the caching instruction.

10. The computer-implemented method of claim 1, further comprising:
    receiving an identifier (ID) request from the viewer peer node; and
    transmitting, in response to receiving the ID request, a network ID to the viewer peer node, for use within the decentralized data delivery network.

11. A tracker server system for distributing a data file within a decentralized data delivery network, comprising:
- at least one processor; and
- a non-transitory physical medium for storing program code accessible by the processor, the program code when executed by the processor causes the processor to:
  - receive a client statistic from a first cacher peer node, wherein the client statistic comprises a first location of the first cacher peer node and a performance specification of the first cacher peer node, and wherein the decentralized data delivery network implements a hybrid architecture comprising one or more peer-to-peer (P2P) connections layered over a content delivery network (CDN) having at least one CDN server providing a first plurality of fragments of the data file to the first cacher peer node;
  - send a caching instruction to the first cacher peer node to download a subset of the first plurality of fragments of the data file from the CDN server, wherein the caching instruction is generated based on the client statistic;
  - receive a request from a viewer peer node in the decentralized data delivery network for accessing one or more target fragments of the data file;
  - extract, from the received request, a content type of the requested data file, and a second location of the viewer peer node;
  - generate a cacher peer list by selecting, from cacher peer nodes currently active in the decentralized data delivery network, one or more cacher peer nodes to provide access to the one or more target fragments of the data file, wherein at least one selected cacher peer node is selected based on the second location of the viewer peer node, a third location of the at least one selected cacher peer node, and the content type of the requested data file; and
  - transmit the generated cacher peer list to the viewer peer node.

12. The tracker server system of claim 11, wherein the program code when executed by the processor further causes the processor to:
- generate a popularity score for the data file, wherein the content type of the data file is a live data stream, and wherein the caching instruction is generated further based on the popularity score.

13. The tracker server system of claim 11, wherein the program code when executed by the processor further causes the processor to:
- determine an optimal distribution of a second plurality of fragments of the data file to two or more cacher peer nodes of the network,
  - wherein the content type of the requested data file is selected from the group consisting of video-on-demand (VOD) and a binary large object (BLOB), and
  - wherein the optimal distribution defines which of the second plurality of fragments of the data file each of the two or more cacher peer nodes should download from the CDN server.

14. The tracker server system of claim 11, wherein the at least one selected cacher peer node in the cacher peer list caches at least one of the one or more target fragments of the data file.

15. The tracker server system of claim 11, wherein the program code when executed by the processor further causes the processor to:
- send payment authorization certificates to the at least one selected cacher peer node on the cacher peer list, to authorize the sharing of the data file to the viewer peer node;
- receive a service receipt from the at least one selected cacher peer node on the cacher peer list, wherein the service receipt was signed by the viewer peer node after receiving at least one of the one or more target fragments of the data file from the at least one selected cacher peer node; and
- send, to the at least one selected cacher peer node, an updated off-chain transaction that accumulates a total payment amount including a payment amount for the at least one of the one or more target fragments of the data file.

16. The tracker server system of claim 11, wherein the second location of the viewer peer node is selected from the group consisting of a network location represented by an IP address, and a geolocation represented by a latitude and a longitude.

17. The tracker server system of claim 11, wherein the caching instruction is generated further based on a content priority of the data file.

18. The tracker server system of claim 11, wherein the viewer peer node comprises a Software Development Kit (SDK) integrated with an existing content viewer, and wherein the SDK generates the request for accessing the one or more target fragments of the data file, and wherein the SDK receives the generated cacher peer list.

19. The tracker server system of claim 11, wherein the first cacher peer node comprises a Software Development Kit (SDK) integrated with an existing content viewer, and wherein the SDK downloads the subset of the first plurality of fragments of the data file from the CDN server in response to receiving the caching instruction.

20. The tracker server system of claim 11, wherein the program code when executed by the processor further causes the processor to:
- receive an identifier (ID) request from the viewer peer node; and
- transmit, in response to receiving the ID request, a network ID to the viewer peer node, for use within the decentralized data delivery network.

* * * * *